(12) United States Patent
Haddock et al.

(10) Patent No.: US 8,925,263 B2
(45) Date of Patent: Jan. 6, 2015

(54) PHOTOVOLTAIC MODULE MOUNTING ASSEMBLY

(71) Applicants: Dustin M. M. Haddock, Colorado Springs, CO (US); Robert M. M. Haddock, Colorado Springs, CO (US)

(72) Inventors: Dustin M. M. Haddock, Colorado Springs, CO (US); Robert M. M. Haddock, Colorado Springs, CO (US)

( * ) Notice: Subject to any disclaimer, the term of this patent is extended or adjusted under 35 U.S.C. 154(b) by 0 days.

(21) Appl. No.: 13/965,441

(22) Filed: Aug. 13, 2013

(65) Prior Publication Data

US 2014/0041706 A1 Feb. 13, 2014

Related U.S. Application Data

(60) Provisional application No. 61/682,570, filed on Aug. 13, 2012.

(51) Int. Cl.
*E04D 13/18* (2014.01)
*E04H 14/00* (2006.01)
*H01L 31/042* (2014.01)
*F24J 2/52* (2006.01)
*F16B 2/12* (2006.01)

(52) U.S. Cl.
CPC ........... *H01L 31/0422* (2013.01); *F24J 2/5254* (2013.01); *F24J 2/5258* (2013.01); *F16B 2/12* (2013.01); *Y02E 10/50* (2013.01); *Y02B 10/20* (2013.01); *Y02B 10/12* (2013.01); *Y02E 10/47* (2013.01)
USPC .......... 52/173.3; 52/126.7; 52/468; 52/475.1; 248/229.14; 248/229.24; 248/231.61; 136/251

(58) Field of Classification Search
USPC ............... 52/173.3, 126.1, 126.5–126.7, 263, 52/466, 468, 475.1; 248/72, 228.1, 228.3, 248/228.5, 201, 229.12, 229.14, 229.22, 248/229.24, 230.3, 230.5, 231.21, 231.41, 248/231.61; 136/244, 251

See application file for complete search history.

(56) References Cited

U.S. PATENT DOCUMENTS

| 5,571,338 | A | * | 11/1996 | Kadonome et al. | 136/251 |
|---|---|---|---|---|---|
| 7,766,292 | B2 | * | 8/2010 | Liebendorfer | 248/237 |
| 8,344,239 | B2 | * | 1/2013 | Plaisted | 136/251 |
| 2008/0302928 | A1 | * | 12/2008 | Haddock | 248/205.1 |
| 2010/0293874 | A1 | * | 11/2010 | Liebendorfer | 52/173.3 |
| 2011/0120047 | A1 | * | 5/2011 | Stearns et al. | 52/698 |
| 2011/0260027 | A1 | | 10/2011 | Farnham, Jr. | |
| 2012/0102853 | A1 | * | 5/2012 | Rizzo | 52/173.3 |
| 2013/0263917 | A1 | * | 10/2013 | Hamamura | 136/251 |

FOREIGN PATENT DOCUMENTS

| WO | 03098126 A1 | 11/2003 |
|---|---|---|
| WO | 2011019460 A2 | 2/2011 |

* cited by examiner

*Primary Examiner* — Brian Glessner
*Assistant Examiner* — Brian D Mattei
(74) *Attorney, Agent, or Firm* — James L. Johnson; Marsh Fischmann & Breyfogle LLP

(57) ABSTRACT

A photovoltaic module mounting assembly (200) uses a mounting device (74), mounting plate (110'), lower bracket (210), upper bracket (230), and stud (114). The mounting plate (110') is positioned on the mounting device (74), and a leg (212) of the lower bracket (210) is positioned on the mounting plate (110'). An outside surface (222) of another leg (220) of the lower bracket (210) includes teeth (224) and engages an inside surface (238) of a leg (236) of the upper bracket (230), which also has teeth (240). The mounting plate (110') engages a lower surface (63) of a photovoltaic module (58), an end of the leg (212) of the lower bracket (210) may engage a side surface (64) of the module (58), and a head (246) on an end of another leg (232) of the upper bracket (230) may engage an upper surface (65) of the module (58).

24 Claims, 26 Drawing Sheets

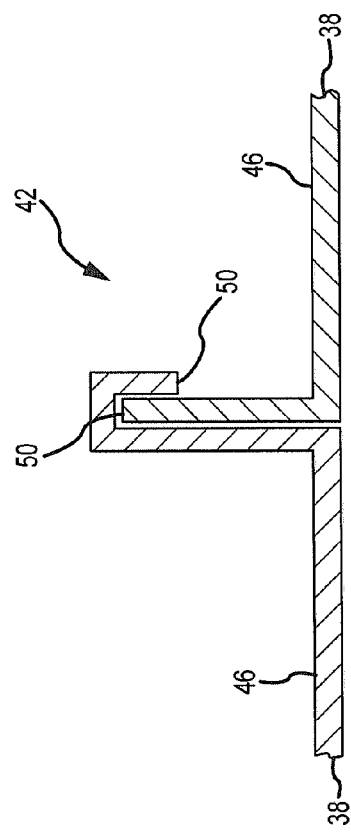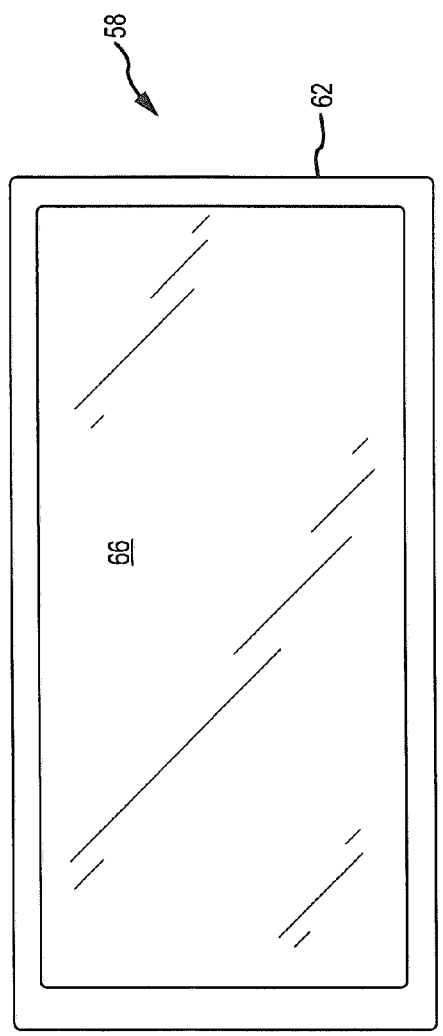

PHOTOVOLTAIC MODULE MOUNTING ASSEMBLY

CROSS-REFERENCE TO RELATED APPLICATIONS

This patent application is a non-provisional patent application of, and claims priority to, pending U.S. Provisional Patent Application Ser. No. 61/682,570, that is entitled "PHOTOVOLTAIC MODULE MOUNTING ASSEMBLY," that was filed on Aug. 13, 2012, and the entire disclosure of which is hereby incorporated by reference in its entirety herein.

FIELD OF THE INVENTION

The present invention generally relates to installing structures on a building surface and, more particularly, to an edge or end clamp that may be used to install a single photovoltaic module on such a building surface.

BACKGROUND

Metal panels are being increasingly used to define building surfaces such as roofs and sidewalls. One type of metal panel is a standing seam panel, where the edges of adjacent standing seam panels of the building surface are interconnected in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that puncturing a metal panel building surface can present leakage and corrosion issues.

Photovoltaic or solar cells have existed for some time, and have been installed on various building roofs. A photovoltaic cell is typically incorporated into a perimeter frame of an appropriate material (e.g., aluminum) to define a photovoltaic module or solar cell module. Multiple photovoltaic modules may be installed in one or more rows (e.g., a string) on a roofing surface to define an array.

FIG. 1 illustrates one prior art approach that has been utilized to mount a solar cell module to a standing seam. A mounting assembly 10 includes a mounting device 74, a bolt 14, and a clamping member 142. Generally, the mounting device 74 includes a slot 90 that receives at least an upper portion of a standing seam 42. A seam fastener 106 is directed through the mounting device 74 and into the slot 90 to forcibly retain the standing seam 42 therein. This then mounts the mounting device 74 to the standing seam 42.

A threaded shaft 22 of the bolt 14 from the mounting assembly 10 passes through an unthreaded hole in a base 154 of a clamping member 142, and into a threaded hole 98 on an upper surface 78 of the mounting device 74. This then mounts the clamping member 142 to the mounting device 74. The clamping member 142 is used to interconnect a pair of different solar cell module frames 62 with the mounting assembly 10. In this regard, the clamping member 142 includes a pair of clamping legs 146, where each clamping leg 146 includes an engagement section 152 that is spaced from the upper surface 78 of the mounting device 74. The bolt 14 may be threaded into the mounting device 74 to engage a head 18 of the bolt with the base 154 of the clamping member 142. Increasing the degree of threaded engagement between the bolt 14 and the mounting device 74 causes the engagement sections 152 of the clamping legs 146 to engage the corresponding solar cell module frame 62 and force the same against the upper surface 78 of the mounting device 74.

SUMMARY

A first aspect of the present invention is directed to a photovoltaic module mounting assembly that includes a mounting device, a mounting plate, a lower bracket, an upper bracket, and a threaded clamp fastener. The mounting device is attachable to a building surface, and the mounting plate is positioned on the mounting device. The lower bracket includes first and second legs. The first leg of the lower bracket is positioned on the mounting plate, and extends from the second leg to a free end that does not extend beyond a location in a first dimension that coincides with an outer perimeter of the mounting plate. The second leg of the lower bracket extends away from the first leg in a second dimension (e.g., the first and second dimensions may be at least generally orthogonal to one another). The upper bracket includes third and fourth legs, with the third leg of the upper bracket and the first leg of the lower bracket being spaced from one another in the second dimension (e.g., a vertical dimension when installed on a roofing surface). The fourth leg of the upper bracket extends from the third leg (e.g., in the second dimension), is disposed in a different orientation than the third leg, and engages the second leg of the lower bracket. The threaded clamp fastener extends through the third leg of the upper bracket, through the first leg of the lower bracket, through the mounting plate, and into threaded engagement with the mounting device. The first leg of the lower bracket is located between this threaded clamp fastener and the fourth leg of the upper bracket in the first dimension (e.g., a lateral or horizontal dimension).

A number of feature refinements and additional features are applicable to the first aspect of the present invention. These feature refinements and additional features may be used individually or in any combination. The following discussion is applicable to the first aspect, up to the start of the discussion of a second aspect of the present invention.

The included angle between the first and second legs of the lower bracket may be about 90°, the included angle between the third and fourth legs of the upper bracket may be about 90°, or both. The first leg of the lower bracket and the third leg of the upper bracket may be least substantially parallel to one another, the second leg of the lower bracket and the fourth leg of the upper bracket may be at least substantially parallel to one another, or both.

The first leg of the lower bracket may incorporate a first hole (e.g., lacking threads), and the third leg of the upper bracket may incorporate a second hole (e.g., lacking threads). These two holes may be offset to at least a degree in the first dimension (e.g., a horizontal or lateral dimension). Consider the case where a first reference axis extends between and is perpendicular to each of the first leg of the lower bracket and the third leg of the upper bracket. An axis extending between the centers of these two holes may be non-parallel to this first reference axis with the mounting assembly being in an assembled state or condition.

A first mating surface of the second leg of the lower bracket may incorporate a plurality of spaced teeth (where this first mating surface projects toward the fourth leg of the upper bracket). A second mating surface of the fourth leg of the upper bracket may incorporate a plurality of spaced teeth (where this second mating surface projects toward the second leg of the lower bracket). The first and second mating surfaces may be disposed in interlocking relation to restrict relative motion between the lower bracket and the upper bracket in the second dimension (e.g., a vertical dimension when the mounting assembly is installed on a roofing surface).

The upper bracket may include a head that is offset from the third leg of the upper bracket in the second dimension. The head may be characterized as being disposed at a higher elevation than the third leg when the mounting assembly is installed on a roofing surface. The head may be characterized as being spaced further from a reference plane (that at least generally contains the first leg of the lower bracket), compared to the third leg of the upper bracket. In any case, the upper bracket may include a transition section between the third leg of the upper bracket and the noted head. This transition section and the free end of the first leg for the lower bracket may be at least substantially aligned in the second dimension (e.g., a vertical dimension when the mounting assembly is installed on a roofing surface).

The head of the upper bracket may be offset from the free end of the first leg of the lower bracket in the first dimension. The head of the upper bracket may be positioned closer to a position in the first dimension, that coincides with an outer perimeter of the mounting plate, than the free end of the first leg of the lower bracket. A free end of the head may be positioned above the mounting plate, or stated another way the head may be positioned in the first dimension so as to not be disposed beyond a position in the first dimension that coincides with the outer perimeter of the mounting plate.

A single, continuous open space may exist between the upper bracket and the lower bracket. In one embodiment, the only portion of the mounting assembly that extends between the upper bracket and the lower bracket through this space is the threaded clamp fastener. A first nut may be mounted on the threaded clamp fastener, may be engaged with the third leg of the upper bracket, and may be positioned outside of the noted open space. A second nut may be mounted on the threaded clamp fastener, may be engaged with the first leg of the lower bracket, and may be positioned within the noted open space.

The mounting assembly of the first aspect may be part of a photovoltaic system. In this regard, a photovoltaic module may be positioned on the mounting plate and may be clamped between the upper bracket and the lower bracket. In one embodiment, an edge portion of the photovoltaic module includes a first side surface, an upper surface, and a lower surface. The lower surface of this edge portion of the photovoltaic module may be positioned on the mounting plate. The free end of the first leg of the lower bracket may engage the first side surface of the edge portion of the photovoltaic module (this free end of the first leg may include a lip that extends in the direction of an overlying portion of the upper bracket). The upper bracket may engage the upper surface of this edge portion of the photovoltaic module (e.g., an underside of the above-noted head may engage this upper surface of the photovoltaic module).

A second aspect of the present invention is directed to a photovoltaic module mounting assembly that includes a mounting device, a lower bracket, an upper bracket, and a threaded clamp fastener. The mounting device is attachable to a building surface. The lower bracket includes first and second legs, where the first leg of the lower bracket extends in a first dimension from a first intersection between the first and second legs, where the second leg extends in a second dimension from this first intersection, and where the first and second dimensions are at least generally orthogonal to one another. The upper bracket includes third and fourth legs, where the third leg of the upper bracket extends in the first dimension from a second intersection between the third and fourth legs, where the fourth leg extends in the second dimension from this second intersection, and where the fourth leg of the upper bracket engages the second leg of the lower bracket. The upper bracket further includes a head, where the third leg is located between the head and the fourth leg in the first dimension. The head and the third leg of the upper bracket are offset from one another in the second dimension, with the head being spaced further from the first leg of the lower bracket, compared to the third leg of the upper bracket and measured within the second dimension. The threaded clamp fastener extends through the third leg of the upper bracket, through an open space between the third leg of the upper bracket and the first leg of the lower bracket, through the first leg of the lower bracket, and into threaded engagement with the mounting device.

A third aspect of the present invention is directed to a photovoltaic module mounting assembly that includes a mounting device, a lower bracket, an upper bracket, and a threaded clamp fastener. The mounting device is attachable to a building surface. The lower bracket includes first and second legs, where the first leg of the lower bracket extends in a first dimension from a first intersection between the first and second legs, where the second leg extends in a second dimension from this first intersection, and where the first and second dimensions are at least generally orthogonal to one another. The upper bracket includes third and fourth legs, where the third leg of the upper bracket extends in the first dimension from a second intersection between the third and fourth legs, where the fourth leg extends in the second dimension from this second intersection, and where the fourth leg of the upper bracket engages the second leg of the lower bracket. The threaded clamp fastener extends through the third leg of the upper bracket, through an open space between the third leg of the upper bracket and the first leg of the lower bracket, through the first leg of the lower bracket, and into threaded engagement with the mounting device. The second leg of the lower bracket is located between the threaded clamp fastener and the fourth leg of the upper bracket in the first dimension.

The lower bracket and upper bracket of each of the second and third aspects may utilize any one more of the features of the lower bracket and the upper bracket, respectively, addressed above in relation to the first aspect. The lower and upper brackets of each of the second and third aspects may be used in place of the lower bracket and upper bracket, respectively, discussed above in relation to the first aspect as well.

A number of feature refinements and additional features are separately applicable to each of above-noted first, second, and third aspects of the present invention. These feature refinements and additional features may be used individually or in any combination in relation to each of the first, second, and third aspects as well. Any references herein to "above," "below," or the like are in relation to the mounting assembly being in an upright position. References herein to a "vertical" dimension may be that which coincides with an upright position or orientation for the mounting assembly. For instance, if the first leg of the lower bracket were supported on a horizontal reference surface (to dispose the mounting assembly in an upright position), the "vertical dimension" would be the dimension that is orthogonal to this horizontal reference surface. In a roofing application, the pitch of the roof may define the baseline for what is "upright" for purposes of the mounting assembly. That is, the noted vertical dimension may be characterized as being the dimension that is orthogonal to the pitch of the roof in this case.

The mounting device may be of any appropriate size, shape, configuration, and/or type. In one embodiment, the mounting device includes a slot for receiving at least part of a standing seam of a roofing surface. One or more threaded fasteners (e.g., having a blunt-nosed or rounded end) may be used to secure the mounting device to any such standing seam, for instance without penetrating the roofing surface.

The threaded clamp fastener may be threaded into a mounting hole on an upper wall or surface of the mounting device. Any appropriate threaded clamp fastener may be utilized to activate a clamping action for the mounting assembly in relation to a photovoltaic module. A threaded stud as the threaded clamp fastener may include a nut whose position is fixed on the stud (e.g., for fixing the lower bracket to a mounting device). Another nut may be threaded onto such a threaded stud (e.g., for directing the upper bracket toward the lower bracket).

The mounting assembly described in relation to each of the first, second, and third aspects may utilize a mounting plate. This mounting plate may be positioned on an upper wall or surface of the mounting device, and the lower bracket may be positioned on this mounting plate. The mounting plate may be a structure having first and second oppositely disposed and planar surfaces. However, various features may be incorporated by the mounting plate to facilitate one or more aspects of the installation of a photovoltaic system. For instance, the mounting plate may incorporate one or more features to facilitate the alignment/positioning of one or more photovoltaic modules relative to the mounting assembly for/during installation when using clamping configurations other than the upper and lower brackets described herein. The mounting plate may incorporate one or more features to facilitate the grounding of a photovoltaic module that is engaged/secured by the corresponding mounting assembly. The mounting plate may incorporate one or more wire management features. Each of these three overall/general features may be individually incorporated by the mounting plate. Any and all combinations of these three overall/general features may be incorporated by the mounting plate as well.

The mounting plate may be of any appropriate size, shape, and/or configuration (e.g., a circular outer perimeter; a square outer perimeter; a rectangular outer perimeter), may be formed from any appropriate material or combination of materials (e.g., a metal or metal alloy), or both. The mounting plate may include an upper surface and an oppositely disposed lower surface, with the lower surface being in contact with the mounting bracket (e.g., its upper surface) when the mounting assembly is installed on a building surface.

The upper surface of the mounting plate may include what may be characterized as a raised structure (e.g., of a continuous or unitary nature). First and second portions on a perimeter of this raised structure may be characterized as first and second PV module positional registrants for when the mounting plate is used with clamping configurations other than the upper and lower brackets described herein. In one embodiment, the free end of the first leg of the lower bracket is located in the first dimension at a position that is beyond an outer perimeter of this raised structure.

The clamp fastener may extend through a center of the noted raised structure on the upper surface of the mounting plate. An outer perimeter of the raised structure may be circular in a plan view. The raised structure may be centrally disposed relative to an outer perimeter of the mounting plate. An outer perimeter of the raised structure and an outer perimeter of the mounting plate may be concentric or concentrically disposed relative to the threaded clamp fastener. The raised structure may be characterized as annular, doughnut-shaped, ring or ring-like, or any combination thereof. In any case, the raised structure may be integrally formed with a remainder of the mounting plate, such that the need to separately attach the raised structure to the mounting plate may be alleviated (e.g., the mounting plate and the raised structure may be a one-piece structure).

The upper surface of the mounting plate may include what may be characterized as a plurality of "grounding projections." Each such grounding projection may be of any appropriate size, shape, configuration, and/or type. The grounding projections may be integrally formed with a remainder of the mounting plate, such that the need to separately attach each grounding projection to the mounting plate is alleviated (e.g., the mounting plate and the plurality of grounding projections may be a one-piece structure).

The various grounding projections may be of a configuration that facilitates establishing an electrical connection with and/or providing a grounding function for a photovoltaic module (e.g., by engaging a frame of such a photovoltaic module, and which may require that the grounding projection(s) pierce or penetrate a surface or surface coating of this frame). For instance, each grounding projection could incorporate one or more edges to desirably interface with a corresponding photovoltaic module. One or more of the grounding projections could be in the form of a tooth or a tooth-like structure. One or more of the grounding projections could be in the form of a hollow cylinder that incorporates at least one edge on a free end thereof.

The grounding projections may be characterized as providing electrical continuity between adjacent photovoltaic modules that are positioned on a common mounting plate (e.g., an electrical path may encompass the frame of one photovoltaic module, one or more grounding projections engaged therewith, an associated mounting plate, one or more additional grounding projections, and the frame of another photovoltaic module engaged by such an additional grounding projection(s)). This may be referred to in the art as "bonding." In any case, the grounding projections may be used in providing a grounding function for a corresponding photovoltaic module(s). The noted electrical connection provided by the grounding projections may be used to electrically connect adjacent photovoltaic modules (e.g., those positioned on a common mounting plate), and which may be used to provide an electrical path to ground a string or collection of photovoltaic modules.

The plurality of grounding projections may be characterized as being spaced about the clamp fastener. The plurality of grounding projections may be equally spaced about the clamp fastener (e.g., located every 90° in the case where there are four grounding projections). In one embodiment, each grounding projection on the upper surface of the mounting plate is located further from the clamp fastener than each of the first and second PV module positional registrants.

Any appropriate number of grounding projections may be utilized on the upper surface of the mounting plate, and multiple grounding projections may be disposed in any appropriate arrangement. One embodiment has at least one grounding projection engaged with each photovoltaic module (e.g., its frame) that is placed on the mounting plate. It should be appreciated that a first grounding projection or a first set of grounding projections could engage a first photovoltaic module placed on the mounting plate, and that a second grounding projection or a second set of grounding projections could engage a second photovoltaic module placed on the mounting plate, where the first and second grounding projections are different ones of the plurality of grounding projections, and where the first and second sets of grounding projections do not include any common grounding projections.

The number and/or arrangement of the plurality of grounding projections may be selected so as to alleviate the need to position the mounting plate on the mounting device in any particular orientation, and yet still allow one or more of the grounding projections to be in contact with each photovoltaic module positioned on the mounting plate. Consider the case where a first reference line extends from the threaded clamp fastener and remains in a fixed position relative to the mounting plate, where a second reference line extends from the clamp fastener and moves along with the mounting plate as the mounting plate is rotated relative to the mounting device about the clamp fastener, and where the first and second reference lines are contained within a common plane. The number and/or arrangement of the plurality of grounding projections may be selected such that any angle may exist between the first and second reference lines (including the case where there is no angle at all or a "zero angle"), and yet still allow one or more grounding projections to be in contact with each photovoltaic module positioned on the mounting plate.

The lower surface of the mounting plate may include at least one wiring clip, including where this lower surface includes a plurality of wiring clips. Any appropriate number of wiring clips may be utilized. Multiple wiring clips may be spaced about the clamp fastener, and including in equally-spaced relation (e.g., every 90° in the case where there are four of such wiring clips).

The wiring clips may be of any appropriate configuration that allows one or more wires to be retained in the space between the wiring clip and the lower surface of the mounting plate. A portion of each wiring clip may be disposed in at least generally parallel and spaced relation to the lower surface of the mounting plate, and this portion may include a recessed region to facilitate the retention of one or more wires, quick-connect leads, or the like therein.

Multiple wiring clips may be disposed in any appropriate arrangement on the lower surface of the mounting plate. Although each mounting clip could be separately attached to the mounting plate, in one embodiment each mounting clip is integrally formed with the remainder of the mounting plate (e.g., such that the mounting plate and each of its mounting clips is a one-piece structure). Consider the case where the mounting clips are "stamped" from the body of the mounting plate. The resulting aperture in the mounting plate may also be utilized in the installation of photovoltaic modules. For instance, an installer may direct a cable or zip tie through such an aperture to bundle a plurality of wires or the like together that are located underneath the mounting assembly or in the space between an adjacent pair of PV modules.

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a leg of a bracket includes "a hole" alone does not mean that this leg includes only a single hole). Moreover, any failure to use phrases such as "at least one" also does not limit the corresponding feature to the singular (e.g., indicating that a leg of a bracket includes "a hole" alone does not mean that this leg includes only a single mounting hole). Use of the phrase "at least generally" or the like in relation to a particular feature encompasses the corresponding characteristic and insubstantial variations thereof (e.g., indicating that a leg of the upper bracket and a leg of the lower bracket are at least generally parallel to on another encompasses the legs being parallel to one another). Finally, a reference of a feature in conjunction with the phrase "in one embodiment" does not limit the use of the feature to a single embodiment.

BRIEF DESCRIPTION OF THE FIGURES

FIG. 3 is a cross-sectional schematic of a representative standing seam defined by interconnecting a pair of panels.

FIG. 4 is a top view of one of the solar cell modules illustrated in FIG. 2.

DETAILED DESCRIPTION

Figure 1:
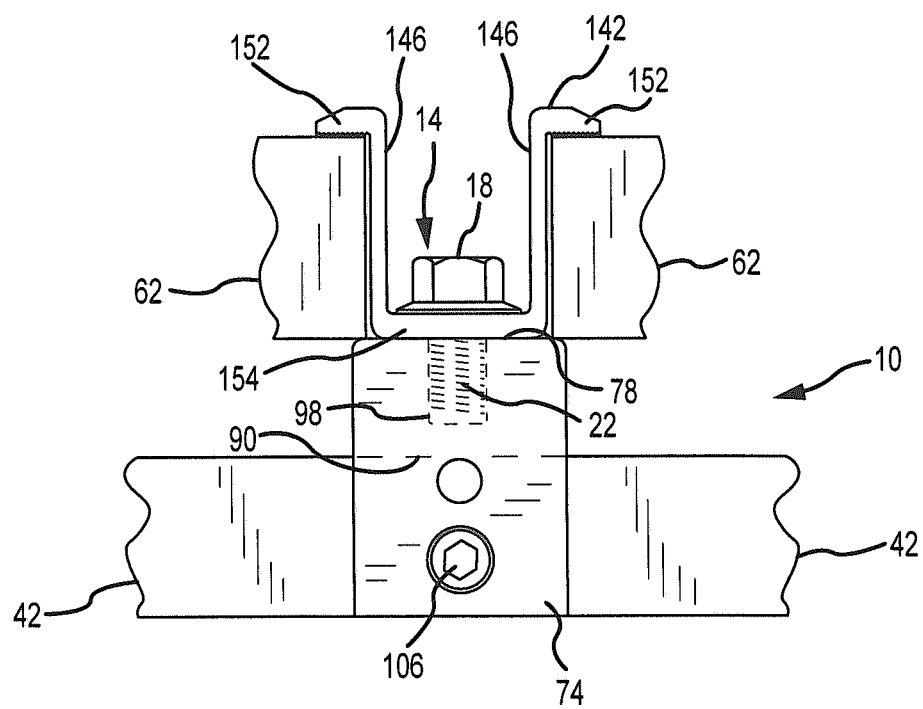
FIG. 1 is a side view of a prior art mounting assembly for interconnecting solar cell modules with a standing seam roof.
Figure 2:
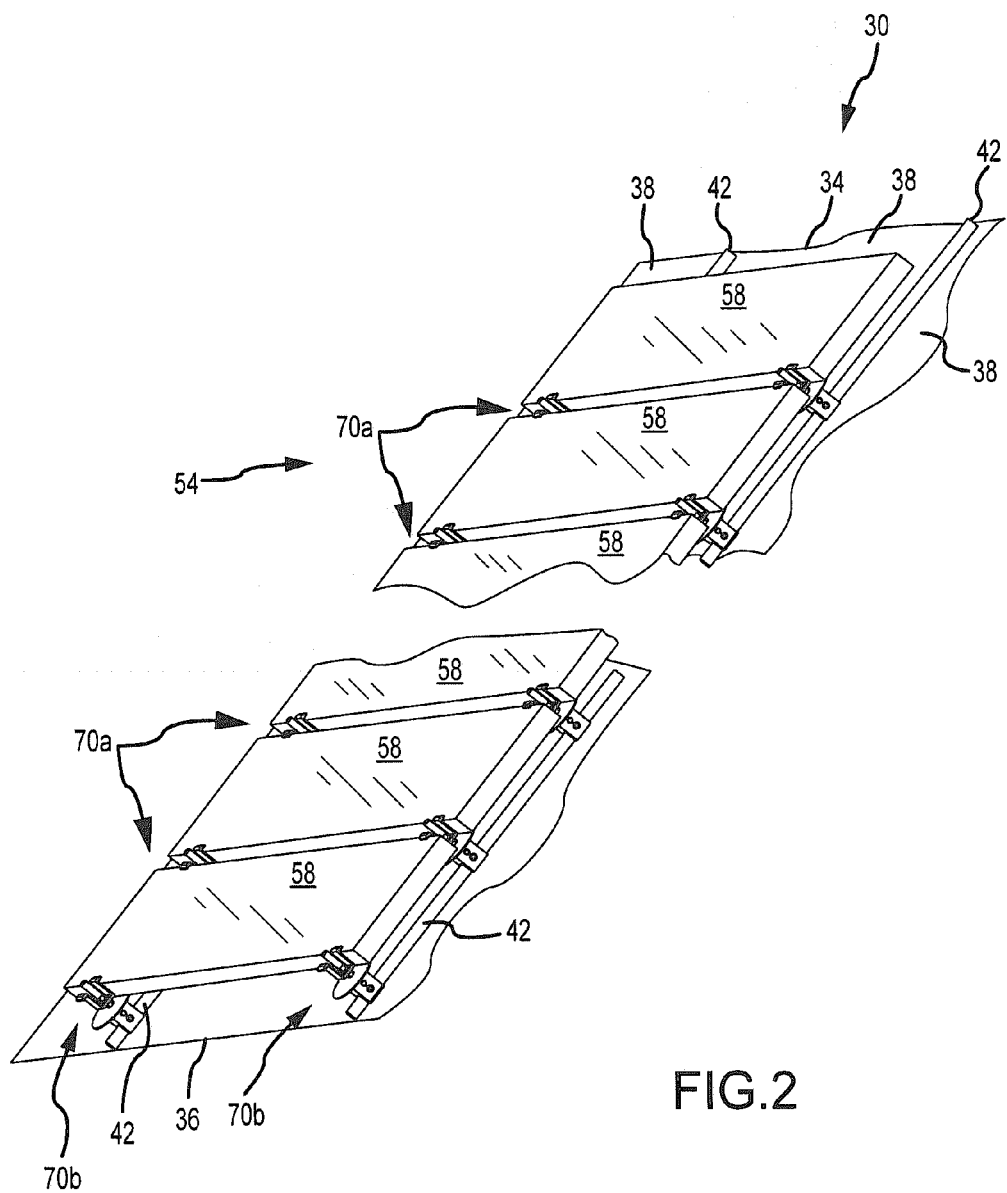
FIG. 2 is a perspective view of a plurality of solar cell modules installed on a standing seam building surface using a plurality of adjustable mounting assemblies.

FIG. 2 illustrates an assembly 30 in the form of a building surface 34, a photovoltaic or solar cell array 54 defined by a plurality of photovoltaic modules or solar cell modules 58 (only schematically shown in FIG. 2), and a plurality of mounting assemblies 70a, 70b. The building surface 34 is defined by interconnecting a plurality of panels 38. Although the panels 38 may be formed from any appropriate material or combination of materials, typically they are in the form of metal panels 38. In any case, each adjacent pair of panels 38 is interconnected in a manner so as to define a standing seam 42 (only schematically shown in FIG. 2). A base 46 is disposed between the opposing edges of each panel 38 (e.g., FIG. 3). The entirety of the base 46 may be flat or planar. However, one or more small structures may be formed/shaped into the base 46 of one or more panels 38 of the building surface 34 to address oil canning. These structures are commonly referred to as crests, minor ribs, intermediate ribs, pencil ribs, striations, fluting, or flutes.

A cross-sectional schematic of one of the standing seams 42 is illustrated in FIG. 3. There it can be seen that a pair of interconnected panels 38 define a standing seam 42. Generally, an edge or edge section 50 of one panel 38 is "nested" with the opposing edge or edge section 50 of the adjacent panel 38 to define a standing seam 42. Typically each the two opposing edges 50 of a given panel 38 will be of a different configuration. That way, one edge 50 (one configuration) of one panel 38 will be able to "nest" with one edge 50 (another configuration) of the adjacent panel 38. Various configurations may be employed for the edges 50 of the panels 38, and which may provide different configurations/profiles for the corresponding standing seam 42.

A more detailed view of one of the photovoltaic modules or solar cell modules 58 from FIG. 2 is presented in FIG. 4. Each solar cell module 58 includes a frame 62 that is disposed about the corresponding solar cell 66. The frame 62 may be of any appropriate size, shape, configuration, and/or type, and may be formed from any appropriate material or combination of materials. In the illustrated embodiment, the frame 62 is of a rectangular profile, and may be formed from an appropriate metal or metal alloy (e.g., aluminum). Similarly, the photovoltaic cell or solar cell 66 may be of any appropriate size, shape, configuration and/or type to convert light into electricity. Typically the solar cell 66 will be in the form of a substrate having a stack of a plurality of layers. Any number of solar cell modules 58 may be used for the solar cell array 54 of FIG. 2, and multiple solar cell modules 58 may be disposed in any appropriate arrangement.

Figure 5:
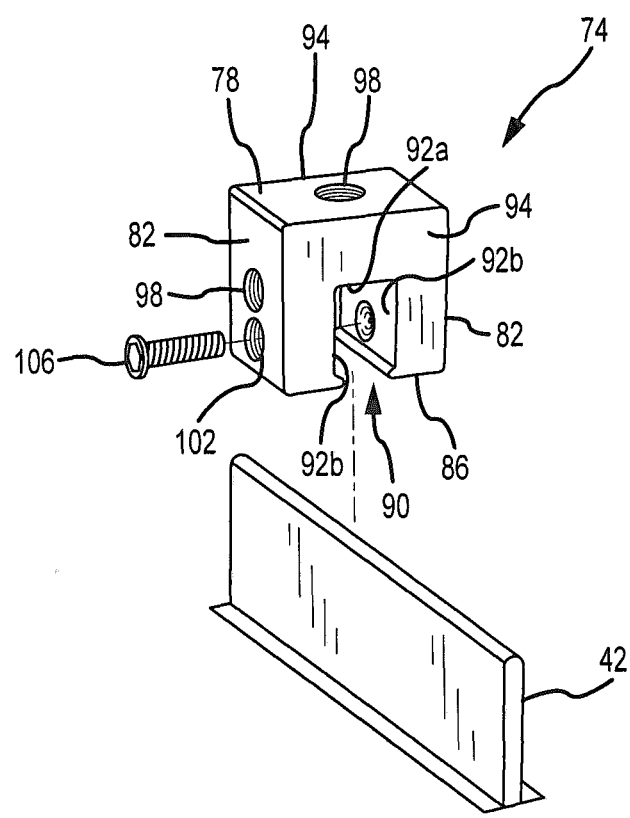
FIG. 5 is a perspective view of one of the mounting devices that is installed on a standing steam in FIG. 2.

The mounting assemblies 70a, 70b that are used to install the solar cell array 54 onto the building surface 34 in FIG. 2 utilize a mounting device 74 that may be of any appropriate size, shape, configuration, and/or type. One configuration of a mounting device that may be installed on a standing seam 42 is illustrated in FIG. 5 and is identified by reference numeral 74. This mounting device 74 includes an upper surface 78 and an oppositely disposed bottom surface 86, a pair of oppositely disposed side surfaces 82, and a pair of oppositely disposed ends 94. The upper surface 78 includes a threaded hole 98, as does at least one of the side surfaces 82, while the bottom surface 86 includes a slot 90 that extends between the two ends 94 of the mounting device 74.

The slot 90 on the bottom surface 86 of the mounting device 74 includes a base 92a and a pair of sidewalls 92b that are spaced apart to receive at least an end section of a standing seam 42. One or more seam fasteners 106 may be directed through a threaded hole 102 of the mounting device 74 and into the slot 90 to engage the standing seam 42 and secure the same against the opposing slot sidewall 92b. A cavity of any appropriate type may be on this opposing slot sidewall 92b to allow the aligned seam fastener 106 to deflect a corresponding portion of the standing seam 42 into this cavity, although such may not be required in all instances. In any case and in one embodiment, the seam fastener 106 only interfaces with an exterior surface of the standing seam 42. For instance, the end of the seam fastener 106 that interfaces with the standing seam 42 may be convex, rounded, or of a blunt-nosed configuration to provide a desirable interface with the standing seam 42.

Other mounting device configurations may be appropriate for mounting on standing seam 42 and that may be used in place of the mounting device 74 shown in FIG. 5. Various mounting device configurations are disclosed in U.S. Pat. Nos. 5,228,248; 5,483,772; 5,941,931; 5,694,721; 5,715,640; 5,983,588; 6,164,033; 6,718,718; 7,100,338; and 7,013,612, and which may be utilized by either of the mounting assemblies 70a, 70b.

Figure 6:
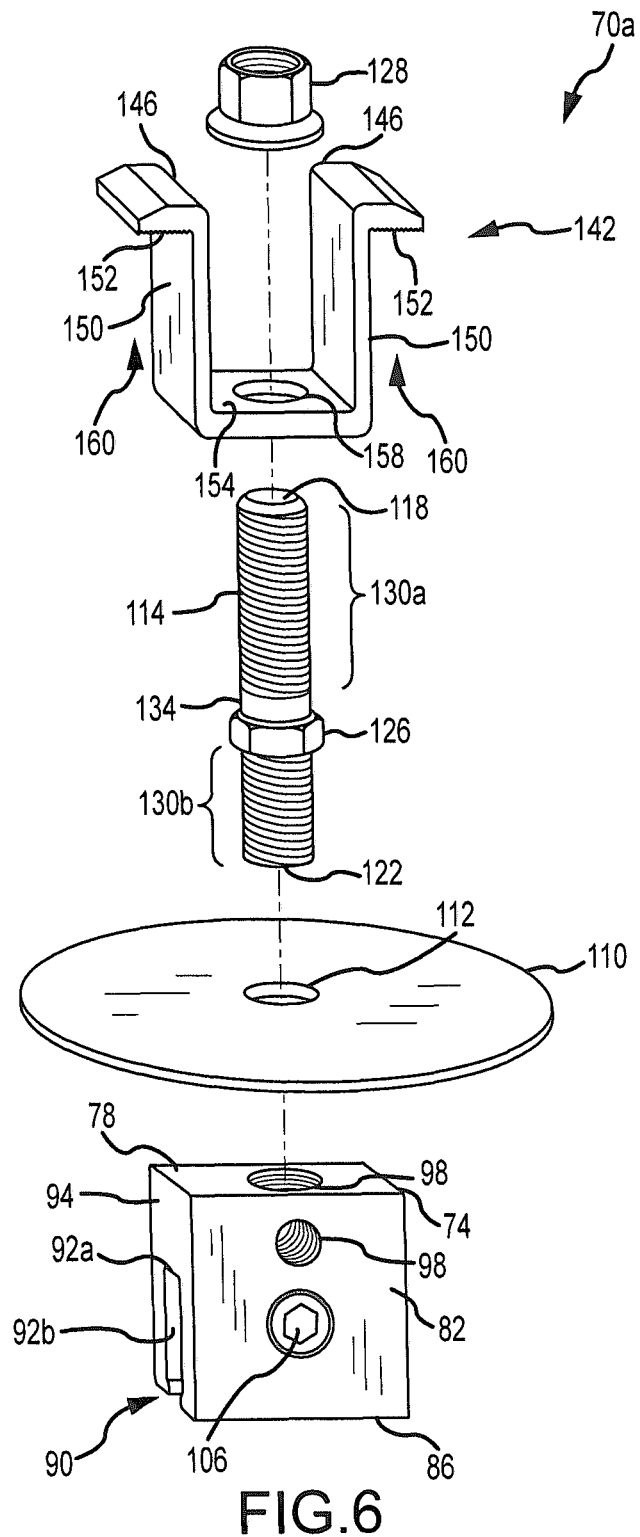
FIG. 6 is an exploded, perspective view of one of the adjustable mounting assemblies from FIG. 2.

The mounting assembly 70a that is used in the installation of a pair of adjacent solar cell modules 58 in FIG. 2, and that may use a mounting device 74, is illustrated in FIG. 6. The mounting assembly 70a includes a mounting device 74, along with a mounting plate 110, a clamping member 142, a stud 114, and a nut 128. The mounting plate 110 is disposed on the upper surface 78 of the mounting device 74, and includes a hole or aperture 112 that allows the stud 114 to pass therethrough. The mounting plate 110 may be utilized when it may be desirable to enhance the stability of the mounting assembly 70a, and in any case may be of any appropriate size, shape, configuration and/or type. The surface area of the mounting plate 110 is at least about 5 in$^2$ in one embodiment, and is at least about 7 in$^2$ in another embodiment. It may be possible to eliminate the mounting plate 110 from the mounting assembly 70a, for instance when the surface area of the upper surface 78 of the mounting device 74 is sufficiently large.

The stud 114 provides an interface between the clamping member 142 and the mounting device 74, and includes a first stud end 118 and an oppositely disposed second stud end 122. A nut 126 is disposed between the first stud end 118 and the second stud end 122, and is fixed to the stud 114 in any appropriate manner (e.g., welded). That is, the nut 126 does not move relative to the stud 114, such that the nut 126 and stud 114 will move together as a single unit. In one embodiment, the nut 126 is threaded onto the stud 114, and is then fixed in the desired location.

A first threaded section 130a extends from the first stud end 118 toward the second stud end 122, while a second threaded section 130b extends from the second stud end 122 toward the first stud end 118. An unthreaded section 134 is disposed between the fixed nut 126 and the first threaded section 130a in the illustrated embodiment. However, the first threaded section 130a could extend all the way to the fixed nut 126 (e.g., the entire stud 114 could be threaded). In one embodiment, the length of the first threaded section is at least about 1.5 inches.

The second stud end 122 may be directed through the hole 112 in the mounting plate 110 if being utilized, and in any case into a threaded hole 98 of the mounting device 74. It should be appreciated that the mounting device 74 could also be disposed in a horizontal orientation on a standing seam having a horizontally disposed end section versus the vertically disposed orientation of the end section of the standing seam 42, and that in this case the second stud end 122 would be directed into the threaded hole 98 on a side surface 82 of the mounting device 74 (e.g., the mounting plate 110 could then be disposed on such a side surface 82 if desired/required). In any case, the stud 114 may be tightened onto the mounting device 74 by having an appropriate tool engage the fixed nut 126 to rotate the stud 114 relative to the mounting device 74 and into a desired forcible engagement with the mounting plate 110 or with the corresponding surface of the mounting device 74 if the mounting plate 110 is not being used. In one embodiment, the fixed nut 126 is located along the length of the stud 114 such that the second stud end 122 does not extend into the slot 90 of the mounting device 74 when the stud 114 is tightened onto the mounting device 74. Having this stud end 122 extend into the slot 90 could potentially damage the standing seam 42.

The clamping member 142 includes a base 154 that is disposed on the fixed nut 26 of the stud 114. A hole 158 extends through the base 154 and is aligned with a threaded hole 98 of the mounting device 74. In the illustrated embodiment, the hole 156 in the clamping member 142 is not threaded such that the clamping member 142 may "slide" along the stud 114.

A pair of clamping legs 146 that are disposed in opposing relation extend upwardly from the base 154 in a direction that is at least generally away from the mounting device 74 when the mounting assembly 70a is installed, such that the base 154 and clamping legs 146 define an at least generally U-shaped structure. Each clamping leg 146 includes an extension 150 and an engagement section 152. The engagement sections 152 are disposed in a different orientation than the extensions 150, and function to provide a surface to engage and clamp a structure to the mounting assembly 70a. In the illustrated embodiment, the engagement sections 150 include teeth, serrations, or like to enhance the "grip" on the structure being clamped to the mounting assembly 70a. The clamping legs 146 may be of any appropriate size, shape, and/or configuration for clamping a structure to the mounting assembly 70a. Generally, a pocket 160 is defined between each engagement section 152 and the underlying mounting plate 110/mounting device 74 for receiving a structure to be clamped to the mounting assembly 70a.

Figure 7A:
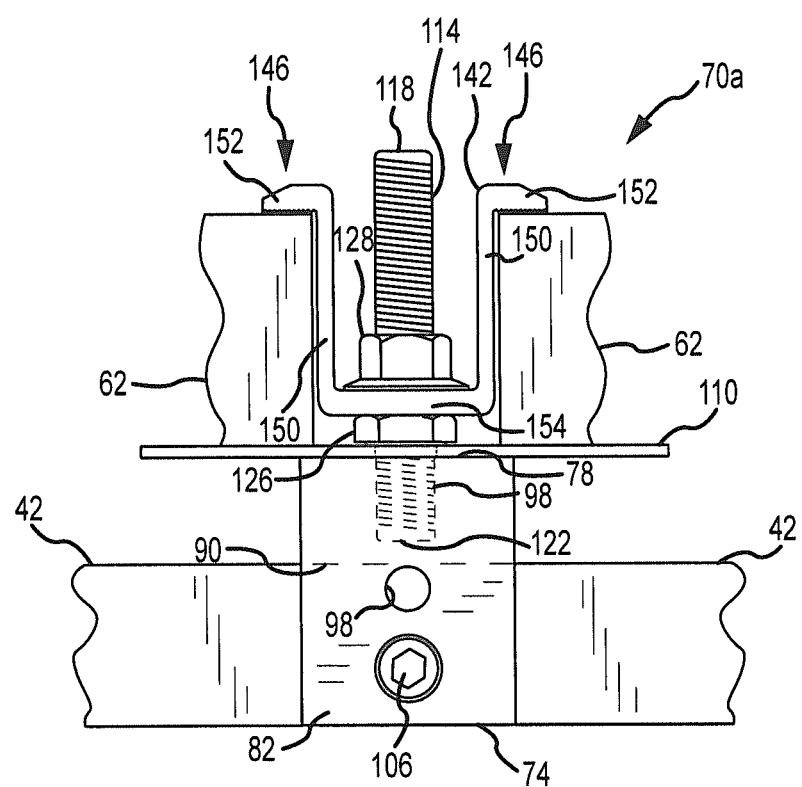
FIG. 7A is a side view of one of the adjustable mounting assemblies from FIG. 2, and which is engaging a pair of solar cell module frames.

FIG. 7A illustrates one of the mounting assemblies 70a from FIG. 2, and which again interfaces with a pair of solar cell modules 58. Installation of such a mounting assembly 70a could entail directing at least the upper portion of the standing seam 42 into the slot 90 of the mounting device 74. Thereafter, the mounting device 74 may be secured to the standing seam 42 using at least one seam fastener 106. Once again, the seam fastener 106 may be directed through the mounting device 74 and into the slot 90 to force a corresponding portion of the standing seam 42 against the opposing slot sidewall 92b.

The mounting plate 110 may be disposed on the upper surface 78 of the mounting device 74 such that its hole 112 is aligned with a threaded hole 98 on the mounting device 74 that will receive the stud 114. The second stud end 122 may then be directed through the hole 112 of the mounting plate 110 such that the stud 114 may be threaded to the mounting device 74 (e.g., using a wrench on the fixed nut 126 to clamp the mounting plate 110 between the fixed nut 126 and the mounting device 74). At this time, the lower surface of the fixed nut 126 engages the upper surface of the mounting plate 110 or a corresponding surface of the mounting device 74 if the mounting plate 110 is not used. As previously noted, and as illustrated in FIG. 7A, in one embodiment the second stud end 122 does not pass into the slot 90 of the mounting device 74. It should be appreciated that the mounting plate 110 and stud 114 could be installed on the mounting device 74 prior to its installation on the standing seam 42.

A frame 62 from one of the solar cell modules 58 may be positioned on one side of the mounting plate 110, while a frame 62 from another of the solar cell modules 58 may be positioned on the opposite side of the mounting plate 110. The clamping member 142 may or may not be positioned on the stud 114 at the time the solar cell module frames 62 are positioned on the mounting plate 110. In any case, the first stud end 118 may be directed through the hole 158 on the base 154 of the clamping member 142. At this time a portion of one solar cell module frame 62 will then be positioned between the mounting plate 110 and the engagement section 152 of one of the clamping legs 146, while a portion of another solar cell module frame 62 will then be positioned between the mounting plate 110 and the engagement section 152 of the other clamping leg 146. The nut 128 may then be threaded onto the first stud end 118 of the stud 114 until the engagement sections 152 of the clamping member 142 exert a desired force on the two solar cell module frames 62 (e.g., to clamp these frames 62 between the engagement sections 152 of the clamping member 142 and the mounting plate 110, or between the engagement sections 152 of the clamping member 142 and the mounting device 74 if the mounting plate 110 is not being used). That is, turning the nut 128 may move the clamping member 142 along the stud 114 and toward the mounting device 74 (e.g., by the clamping member 142 "sliding" along the stud 114) to generate the desired clamping action. It should be appreciated that the clamping member 142 and possibly the nut 128 could be positioned on the stud 114 at the time when the solar cell module frames 62 are disposed on the mounting plate 110, although this may require that the clamping member 142 be lifted to a degree at this time to accommodate positioning the frames 62 under the engagement sections 152 of the clamping member 142.

Figure 7B:
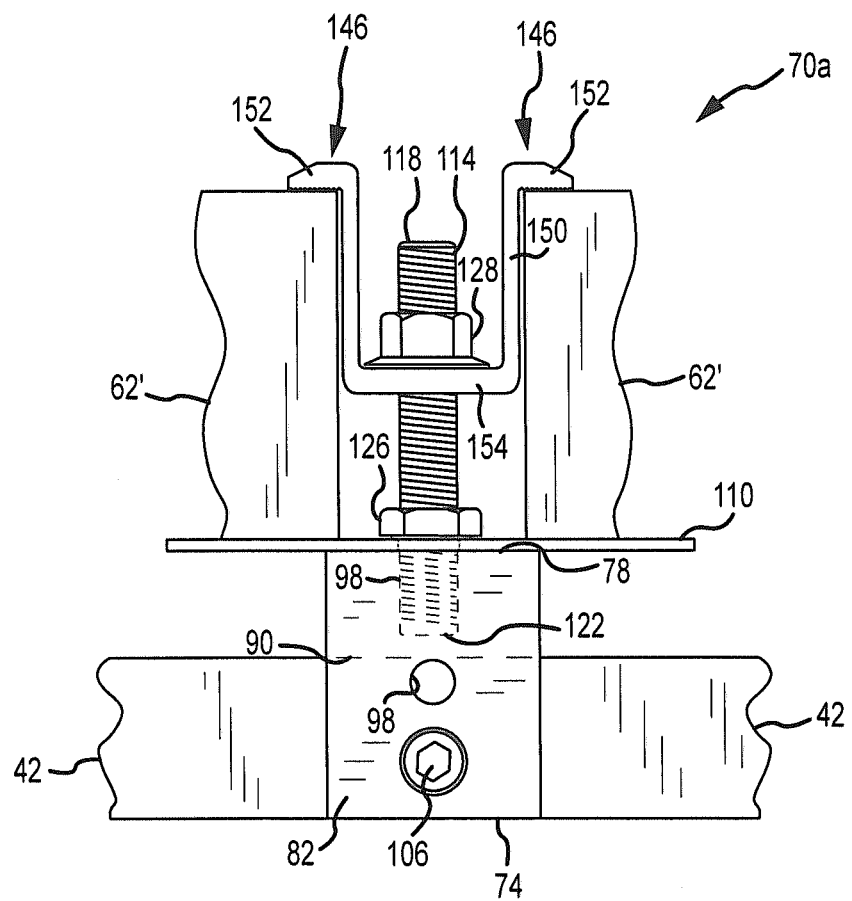
FIG. 7B shows the mounting assembly of FIG. 7A being used for solar cell module frames having a different thickness than those illustrated in FIG. 7A.

As evident by a review of FIG. 7A, the stud 114 may extend beyond the nut 128 in the installed configuration. Preferably the first threaded section 130a of the stud 114 is of a length that allows the mounting assembly 70a to be used to clamp structures of various thicknesses to the mounting assembly 70a. For instance, FIG. 7B illustrates a pair of solar cell module frames 62' being clamped to the mounting assembly 70a, where these frames 62' are thicker than the frames 62 presented in FIG. 7A. In one embodiment, the length of the first threaded section 130a is at least about 1.5 inches, and which accommodates using the mounting assembly 70a to clamp solar cell modules of a number of different thicknesses (e.g., the fixed nut 126 may be spaced from the first stud end 118 by a distance of at least about 1.5 inches, the first threaded section 130a may extend all the way to the fixed nut 126, or both).

Figure 7C:
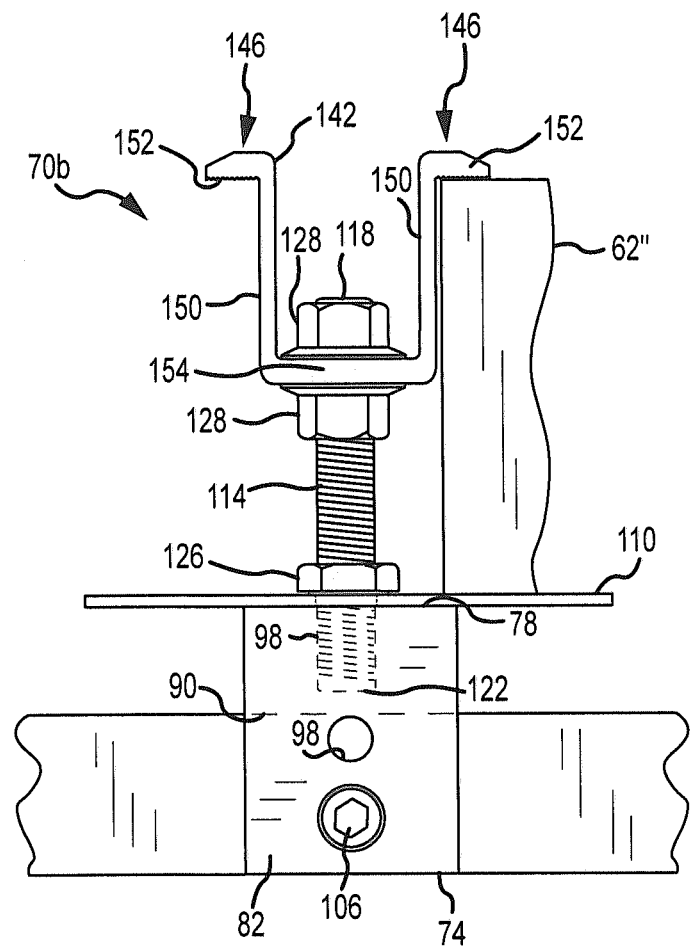
FIG. 7C is a side view of one of the adjustable mounting assemblies from FIG. 2 that is disposed adjacent to an edge of the building surface, and which is engaging a single solar cell module frame.

The above-described mounting assemblies 70a may be used to simultaneously engage the frame 62 of a pair of solar cell modules 58. In at least some cases, there may only be a need to engage a single solar cell 58, such as in the case of those solar cells 58 that are disposed closest to an edge 36 of the building surface 34 (FIG. 2). FIG. 7C illustrates a configuration for this situation, and which is identified by reference numeral 70b. Corresponding parts of the mounting assemblies 70a and 70b are identified by the same reference numeral. The only difference between the mounting assembly 70b and the mounting assembly 70a is that an additional nut 128 is used by the mounting assembly 70b. Therefore, the remainder of the discussion presented above also applies to the mounting assembly 70b.

Generally, one nut 128 is threaded onto the first stud end 118, followed by positioning a clamping member 142 over the first stud end 118 and onto the stud 114, then followed by a second nut 128 that is threaded onto the first stud end 118. The lower nut 128 may be threaded down a sufficient distance on the stud 114. Thereafter, the top nut 128 may be threaded to clamp a solar cell module frame 62" between the mounting plate 110 and the engagement section 152 of one of the clamping members 142. The lower nut 128 may then be threaded upwardly on the stud 118 to engage the underside of the base 154 of the clamping member 142.

Another embodiment of a mounting assembly, which may be used for mounting photovoltaic or solar cell modules to a building surface having a plurality of standing seams defined by a plurality of interconnected panels, is illustrated in FIGS. 8A-F and is identified by reference numeral 70c. Corresponding components between the mounting assembly 70c and the above-discussed mounting assembly 70a are identified by the same reference numerals. Those corresponding components between these two embodiments that differ in at least some respect are identified by the same reference numeral, but with a "single prime" designation in relation to the mounting assembly 70c.

The mounting assembly 70c of FIGS. 8A-F utilizes the above-discussed mounting device 74, clamping member 142, and stud 114. All of the features discussed above in relation to each of these components remain equally applicable to the mounting assembly 70c. The mounting assembly 70c does utilize a mounting plate 110' that is positioned on an upper surface 78 of the mounting device 74, and that is located between the clamping member 142 and the mounting device 74 in a dimension corresponding with the length dimension of the stud 114. However, the mounting place 110' is of a different configuration than the mounting plate 110 utilized by the mounting assembly 70a, and therefore the noted "single prime" designation is utilized.

The mounting plate 110' includes an upper surface 170 and an oppositely disposed lower surface 176. The upper surface 170 includes a plurality of grounding projections 172. The grounding projections 172 may be integrally formed with a remainder of the mounting plate 110' (e.g., the mounting plate 110' and grounding projections 172 may be of one-piece construction, such that the individual grounding projections 172 do not need to be separately attached to the mounting plate 110'). Any appropriate number of grounding projections 172 may be utilized. Each grounding projection 172 may be of any appropriate size, shape, and/or configuration. The various grounding projections 172 may be equally spaced from the stud 114, may be equally spaced about the stud 114, or both.

In one embodiment, the number of grounding projections 172 is selected and the grounding projections 172 are arranged such that at least one grounding projection 172 will engage each photovoltaic module being mounted to a building surface by the clamp assembly 70c, regardless of the angular position of the mounting plate 110' relative to the stud 114. "Angular position" does not mean that the mounting plate 110' is disposed at an angle relative to the upper surface 78 of the mounting device 74. Instead, "angular position" means a position of the mounting plate 110' that may be realized by rotating the mounting plate 110' relative to the stud 114 and/or the mounting device 74. Consider the case where the ends 94 of the mounting device 74 define the 12 o'clock and 6 o'clock positions. The mounting plate 110' may be positioned on the mounting device 74 with each of its grounding projections 172 being disposed at any angle relative to the 12 o'clock position (e.g., in the 1 o'clock position, in the 2 o'clock position, in the 8 o'clock position, etc), and yet at least one grounding projection 172 will engage each photovoltaic module being mounted to a building surface by the clamp assembly 70c. The "angle" of each such grounding projection 172 is the angle between first and second reference lines that are disposed within a common plane, the first reference line remaining in a fixed position relative to the mounting plate 110' and extending from the stud 114, for instance, to the noted 12 o'clock position. The second reference line may also extend from the stud 114 to a particular grounding projection 172, and thereby may rotate along with the mounting plate 110' as its angular position is adjusted relative to the stud 114 and/or mounting device 74.

The grounding projections 172 may facilitate establishing an electrical connection with and/or assisting in grounding one or more photovoltaic modules. The grounding projections 172 may be characterized as providing electrical continuity between adjacent photovoltaic modules that are positioned on the same mounting plate 110' (e.g., an electrical path may encompass the frame of one photovoltaic module, one or more grounding projections 172 engaged therewith, the mounting plate 110', one or more additional grounding projections 172, and the frame of another photovoltaic module engaged by such an additional grounding projection(s) 172). This may be referred to in the art as "bonding." In any case, the grounding projections 172 may be used in providing a grounding function for a corresponding photovoltaic module(s). The noted electrical connection provided by the grounding projections 172 may be used to electrically connect adjacent photovoltaic modules (e.g., those positioned on a common mounting plate 110'), and which may be used to provide an electrical path to ground a string or collection of photovoltaic modules.

The mounting device 110' also includes a raised structure 174 on its upper surface 170. The raised structure 174 may be disposed about the un-threaded hole 112 in the mounting plate 110' and through which the stud 114 passes. Generally and as will be discussed in more detail below, the raised structure 174 may be used to determine where a photovoltaic module should be positioned on the upper surface 170 of the mounting plate 110' to ensure that the clamping member 142 will adequately engage not only this photovoltaic module, but an adjacently disposed photovoltaic module as well. As such, the raised structure 174 may be characterized as a positional registrant or alignment feature for each an adjacent pair of photovoltaic modules being clamped by a common mounting assembly 70c.

The raised structure 174 may be integrally formed with a remainder of the mounting plate 110' (e.g., the mounting plate 110' and raised structure 174 may be of one-piece construction, such that the raised structure 174 does not need to be separately attached to the mounting plate 110'). The raised structure 174 may be characterized as being doughnut-shaped. The raised structure 174 may extend completely about the stud 114, the stud 114 may extend through a center of the raised structure 174, or both. The raised structure 174 may be circular in a plan view. This alleviates the requirement to have the mounting plate 110' be in a certain angular position on the upper surface 78 of the mounting device 74 to provide its positional registration or alignment function in relation to the photovoltaic modules to be clamped. An outer perimeter of the raised structure 174 and an outer perimeter of the mounting plate 110' may be concentrically disposed relative to the stud 114. The raised structure 174 may be centrally disposed relative to an outer perimeter of the mounting plate 110'.

The lower surface 176 of the mounting plate 110' includes a plurality of wiring tabs or clips 178. The wiring clips 178 may be integrally formed with a remainder of the mounting plate 110' (e.g., the mounting plate 110' and wiring clips 178 may be of one-piece construction, such that the individual wiring clips 178 do not need to be separately attached to the mounting plate 110'). For instance, the wiring clips 178 could be "stamped" from the body of the mounting plate 110'. In this regard, the mounting plate 110' includes an aperture 184 for each such wiring clip 178. Any appropriate number of wiring clips 178 may be utilized. The various wiring clips 178 may be equally spaced from the stud 114, may be equally spaced about the stud 114, or both.

In one embodiment, the number of wiring clips 178 is selected and the wiring clips 178 are arranged such that at least one wiring clip 178 should be available for holding/retaining one or more wires from/for each photovoltaic module being mounted to a building surface by the clamp assembly 70c, regardless of the angular position of the mounting plate 110' relative to the stud 114 and/or mounting device 74.

Each wiring clip 178 may be of any appropriate size, shape, and/or configuration. In the illustrated embodiment, each wiring clip 178 includes a first segment 180a that extends away from the lower surface 176 of the mounting plate 110', along with a second segment 180b that extends from a distal end of the first segment 180a. The second segment 180b may be disposed at least generally parallel with the lower surface 176 of the mounting plate 110'. In any case, the second segment 180b may include a recessed region 182 (e.g., a concave area) to facilitate retention of one or more wires and/or quick-connect leads.

A wiring clip 178 may be used the support and/or retain the quick-connect lead(s) associated with one of the photovoltaic modules being clamped by the corresponding mounting assembly 70c (e.g., by being positioned within the space between the second segment 180b of a given wiring clip 178 and the lower surface 176 of the mounting plate 110', for instance by resting in a concave portion of the second segment 180b in the form of the noted recessed region 182). Other wires could be directed into the space between the second segment 180b of a given wiring clip 178 and the lower surface 176 of the mounting plate 110'.

Another function is indirectly provided by the wiring clips 178. The aperture 184 associated with each wiring clip 178 provides a space through which an installer may direct cable or zip tie or the like to bundle together various wires that may be located at a lower elevation than the mounting plate 110' (e.g., wires underneath the mounting assembly 70c; wires underneath a photovoltaic module being clamped by the mounting assembly 70c; wires in a space between a pair of photovoltaic modules being clamped by the mounting assembly 70c).

Figure 8A:
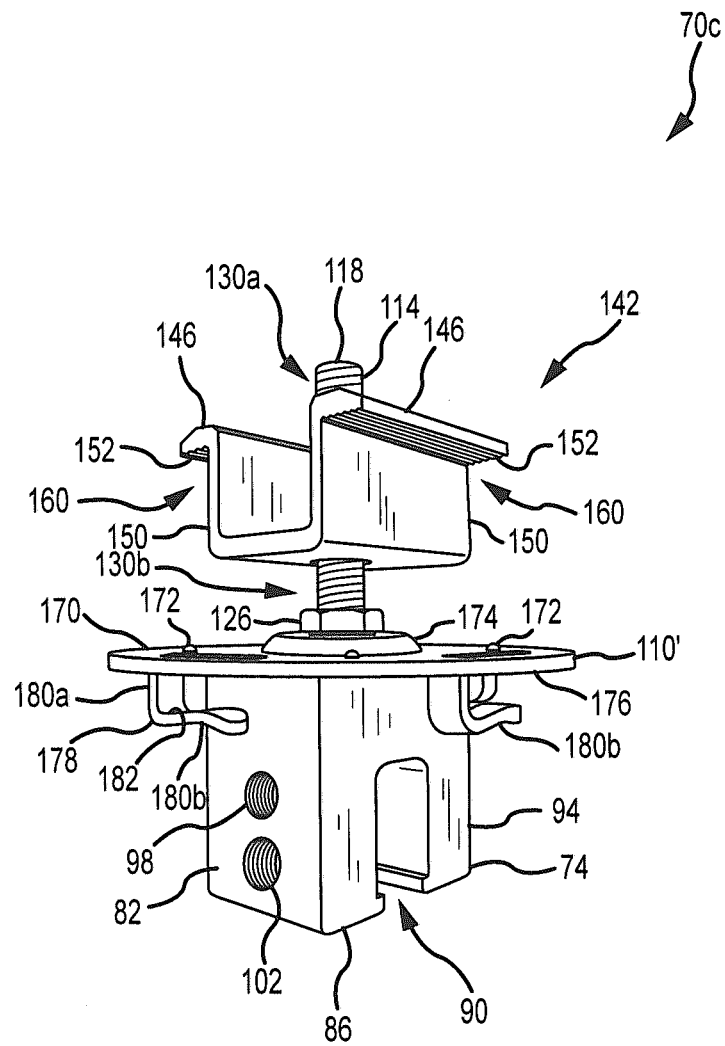
FIG. 8A is one side-based perspective view of another embodiment of a mounting assembly for photovoltaic modules.
Figure 8B:
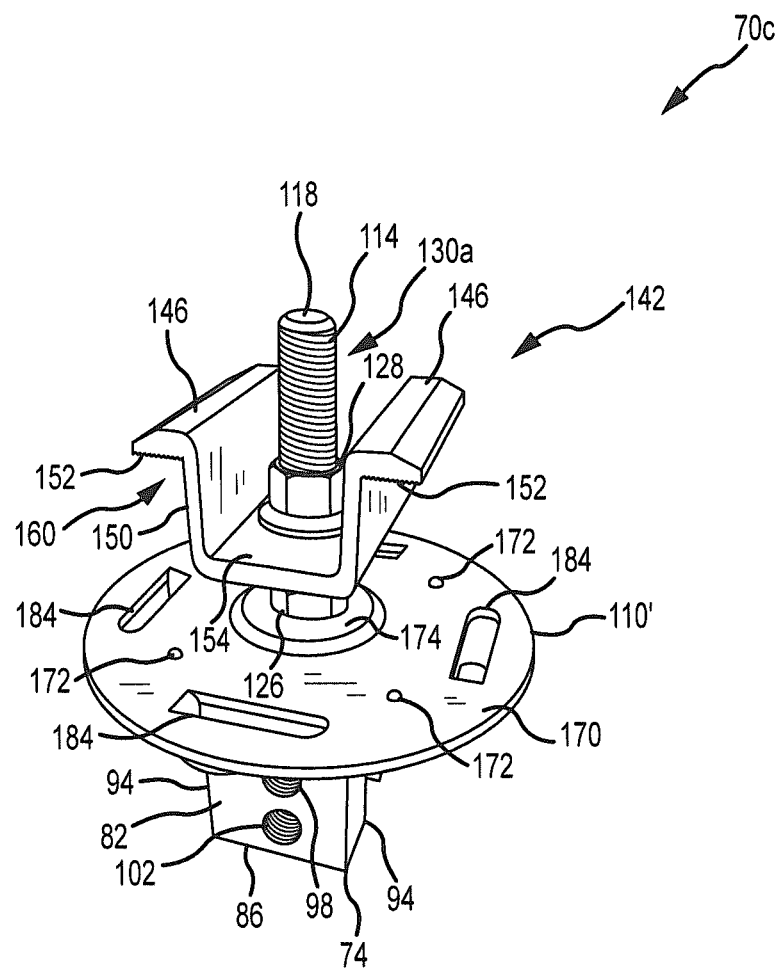
FIG. 8B is one top-based perspective view of the mounting assembly of FIG. 8A.
Figure 8C:
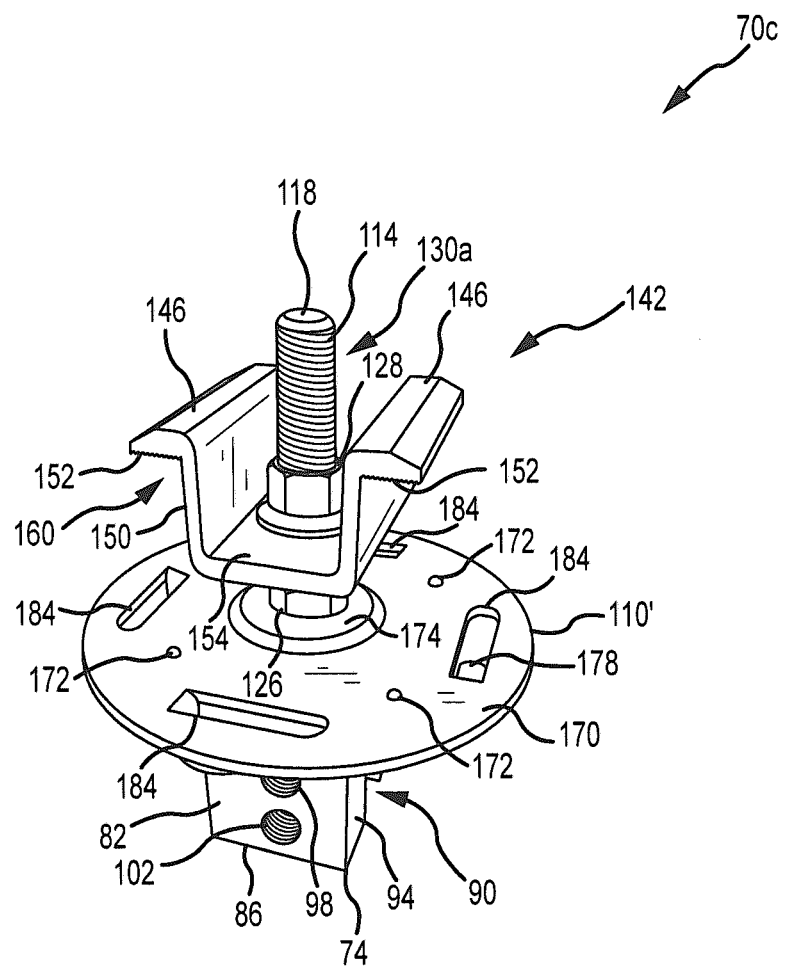
FIG. 8C is another one top-based perspective view of the mounting assembly of FIG. 8A.
Figure 8D:
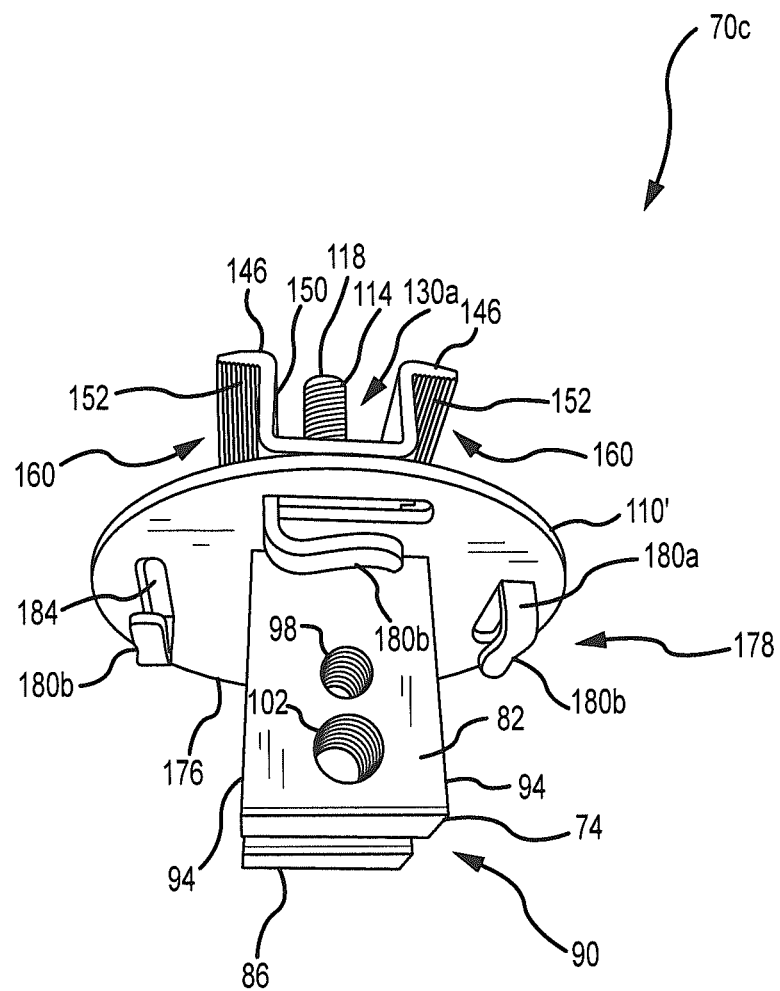
FIG. 8D is a bottom-based perspective view of the mounting assembly of FIG. 8A.
Figure 8E:
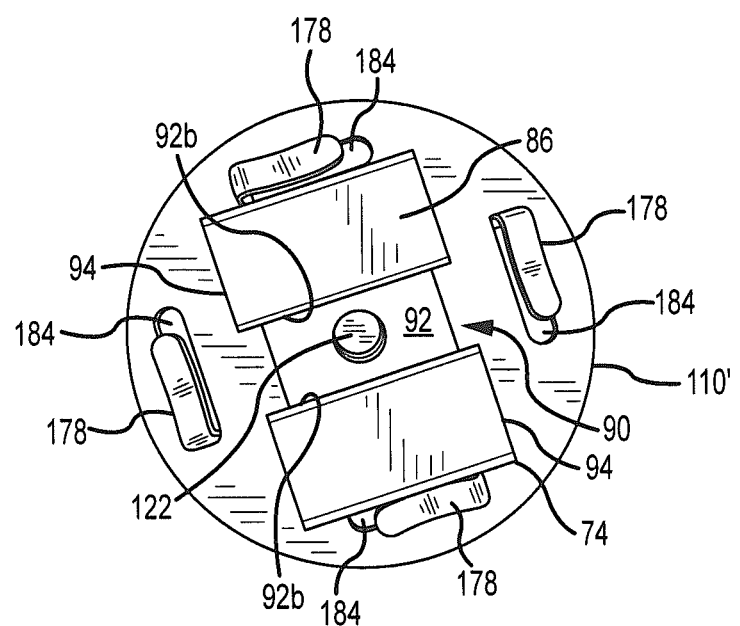
FIG. 8E is a plan view of a bottom of the mounting assembly of FIG. 8A.
Figure 8F:
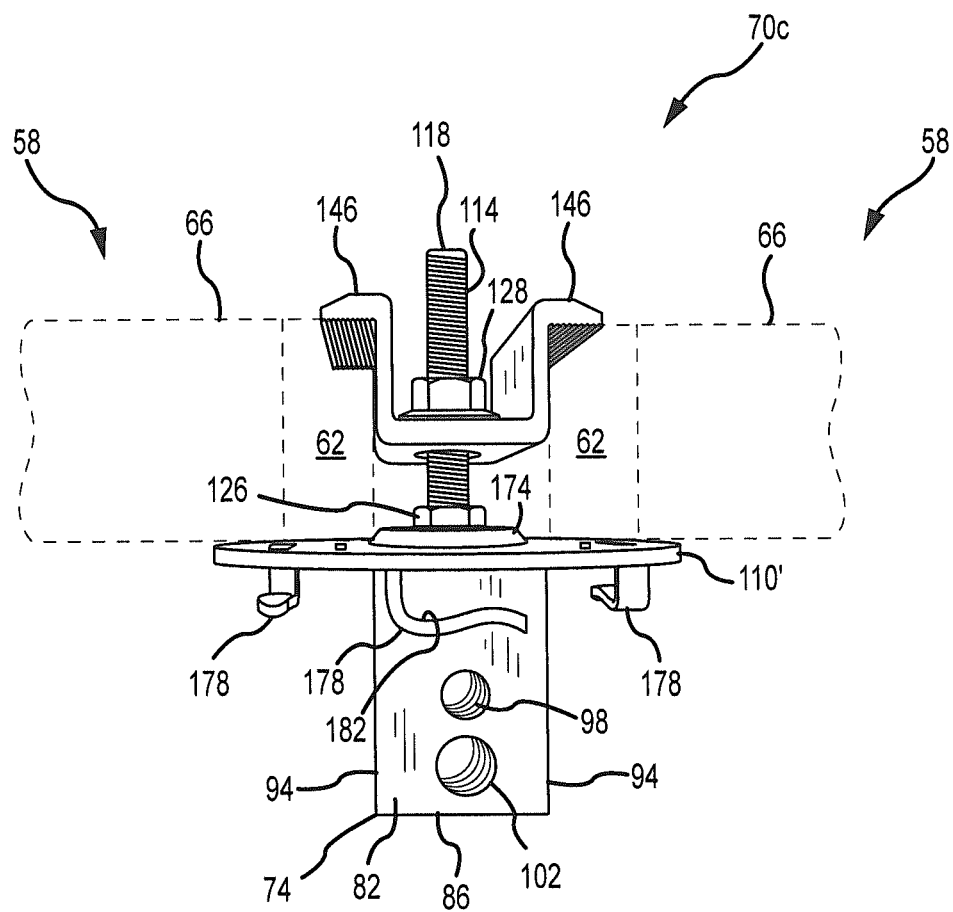
FIG. 8F is another side-based perspective view of the mounting assembly of FIG. 8A, and schematically illustrating the engagement of a pair of photovoltaic modules.

FIG. 8F schematically illustrates the positional registration/alignment function provided by the raised structure 174 of the mounting plate 110'. Here the frame 62 of one photovoltaic module 58 being clamped by the mounting assembly 70c abuts one portion on a perimeter of the raised structure 174, while the frame 62 of another photovoltaic module 58 being clamped by the mounting assembly 70c is disposed adjacent to (or possibly abutting with) an oppositely disposed portion on the perimeter of the raised structure 174. In one embodiment, the width or outer diameter of the raised structure 174 is the same as or slightly larger than the spacing between the two extensions 150 of the clamping member 142. In any case, the raised structure 174 should be sized such that when an adjacent pair of photovoltaic modules 58 are positioned to abut oppositely disposed portions on the perimeter of the raised structure 174, the clamping member 142 should be positionable on the stud 114 and should properly engage these photovoltaic modules.

At least one grounding projection 172 of the mounting plate 110' shown in FIG. 8F should be engaged with the frame 62 of one photovoltaic module 58 shown in FIG. 8F, and at least one other grounding projection 172 of this same mounting plate 110' should be engaged with the frame 62 of the other photovoltaic module 58 shown in FIG. 8F. This again provides electrical continuity between the two modules 58 shown in FIG. 8F—an electrical path exists from one module 58 to the other module 58 via the mounting plate 110' and each grounding projection 172 that is engaged with either of the modules 58.

Figure 9A:
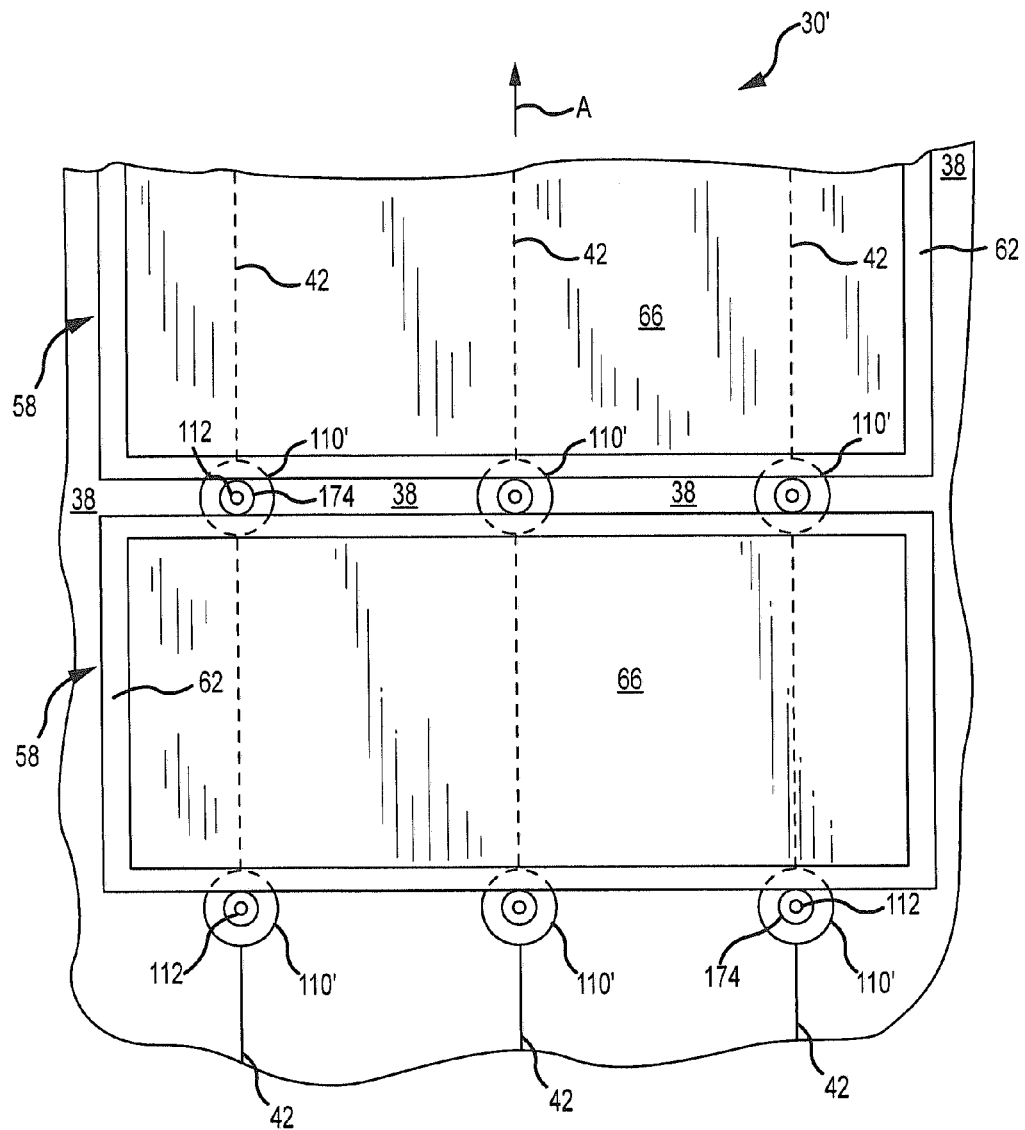
FIG. 9A is a plan view of one embodiment of a photovoltaic system using a plurality of the mounting assemblies of FIGS. 8A-F, and with the clamping members being removed to illustrate a positional registration function incorporated by the mounting plate of such mounting assemblies.

FIG. 9A illustrates the positional registration or alignment function provided by the mounting plate 110' incorporating a raised structure 174 (which thereby may be referred to as a PV module positional registrant). In FIG. 9A, the mounting devices 74 are attached to the standing seams 42 such that the frame 62 of the photovoltaic module 58 engages a portion on the outer perimeter of the raised structure 174. The clamping member 142 for each such mounting device 74 should not only be in proper position to adequately engage the frame 62 of the photovoltaic module 58 shown in FIG. 9A, but the clamping member 142 for each such mounting device 74 should also be in proper position to adequately engage the frame 62 of another photovoltaic module 58 that would be positioned in the uphill direction A (e.g., the arrow A indicating the direction of increasing elevation) from the illustrated photovoltaic module 58. The frame 62 of this "uphill" photovoltaic module 58 would likely engage an opposing portion of the raised structure 174 (or be disposed in closely spaced relation thereto). Any "downward drifting" of this uphill photovoltaic module 58 should be stopped by engaging the raised structure 174 of the "downhill" mounting assemblies 70c.

Figure 9B:
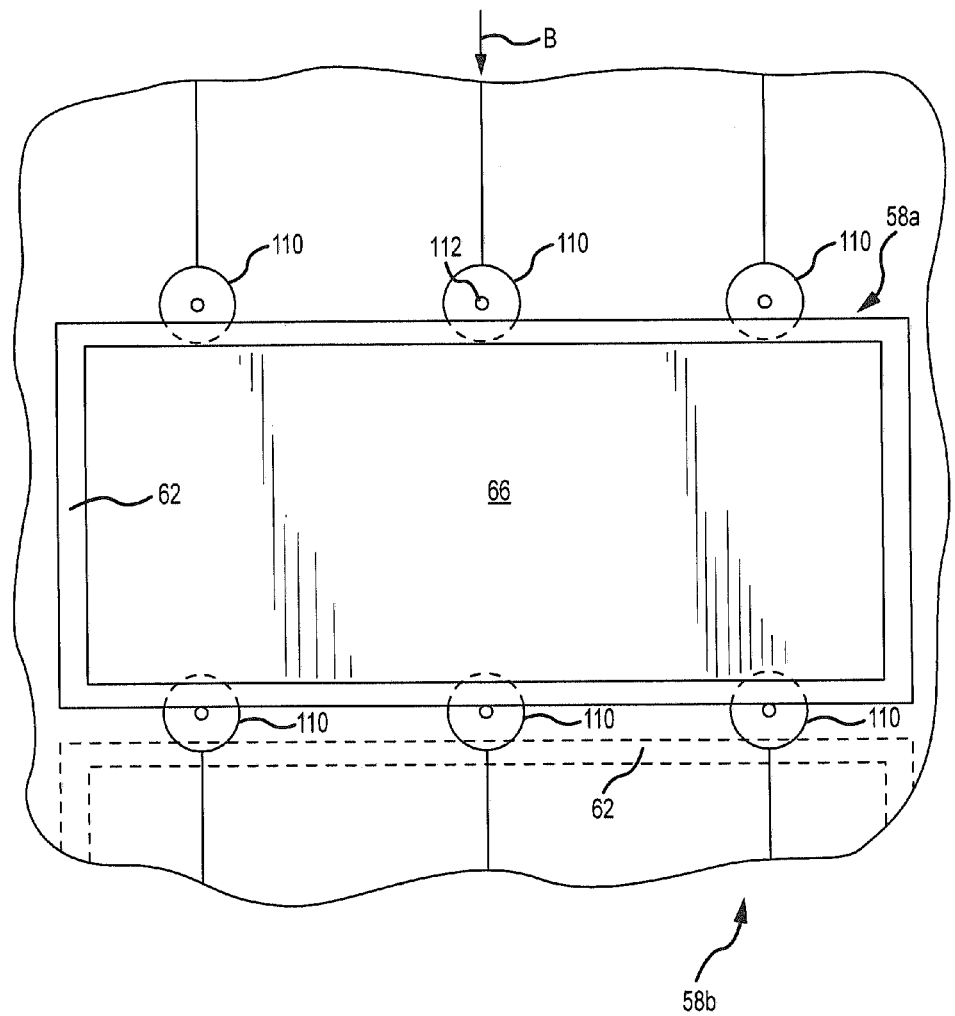
FIG. 9B is a plan view of a photovoltaic system using a plurality of the mounting assemblies of FIG. 6, and with the clamping members being removed therefrom to illustrate how a misaligned mounting assembly can affect the ability of the same to clamp onto one or more photovoltaic modules.

Now compare FIG. 9A to FIG. 9B. In FIG. 9B, the mounting assembly 70a has been used, and whose mounting plate 110 does not incorporate the raised structure 174 from the mounting plate 110' of FIGS. 8A-F. Here it can be seen that the uphill photovoltaic module 58a (the arrow B in FIG. 9B indicating the downhill direction, or direction of decreasing elevation) has been positioned relative to the three lower mounting devices 74 such that its frame 62 is quite close to the hole 112 of the three lower mounting plates 110 (through which the stud 114 is directed to threadably engage the mounting device 74). The three clamping members 142 associated with these three "downhill" mounting plates 110 now may not sufficiently engage the downhill photovoltaic module 58b.

Figure 10A:
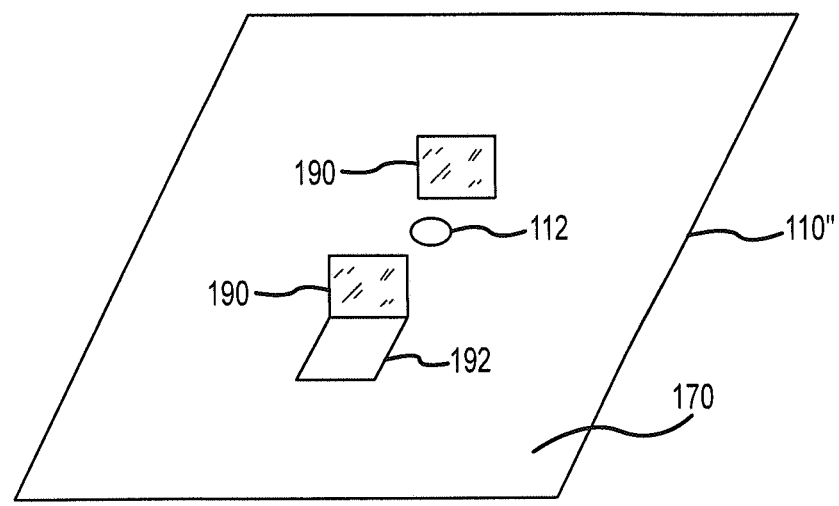
FIG. 10A is a perspective view of another embodiment of a mounting plate that incorporates a discrete pair of PV module positional registrants.
Figure 10B:
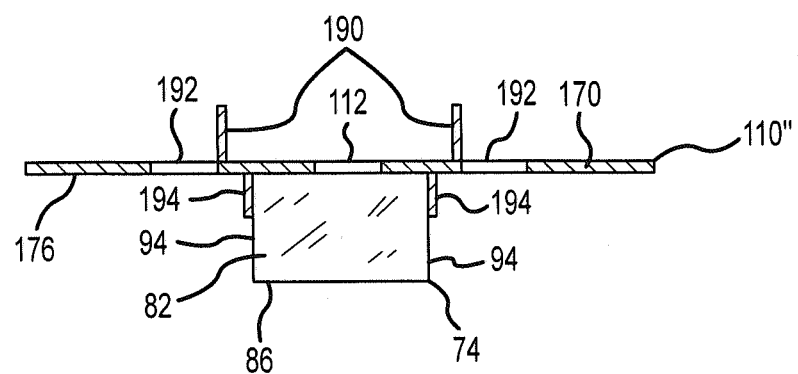
FIG. 10B is a side view of the mounting plate of FIG. 10 disposed on a mounting device, where the mounting plate includes a pair of mounting device positional registrants.
Figure 11:
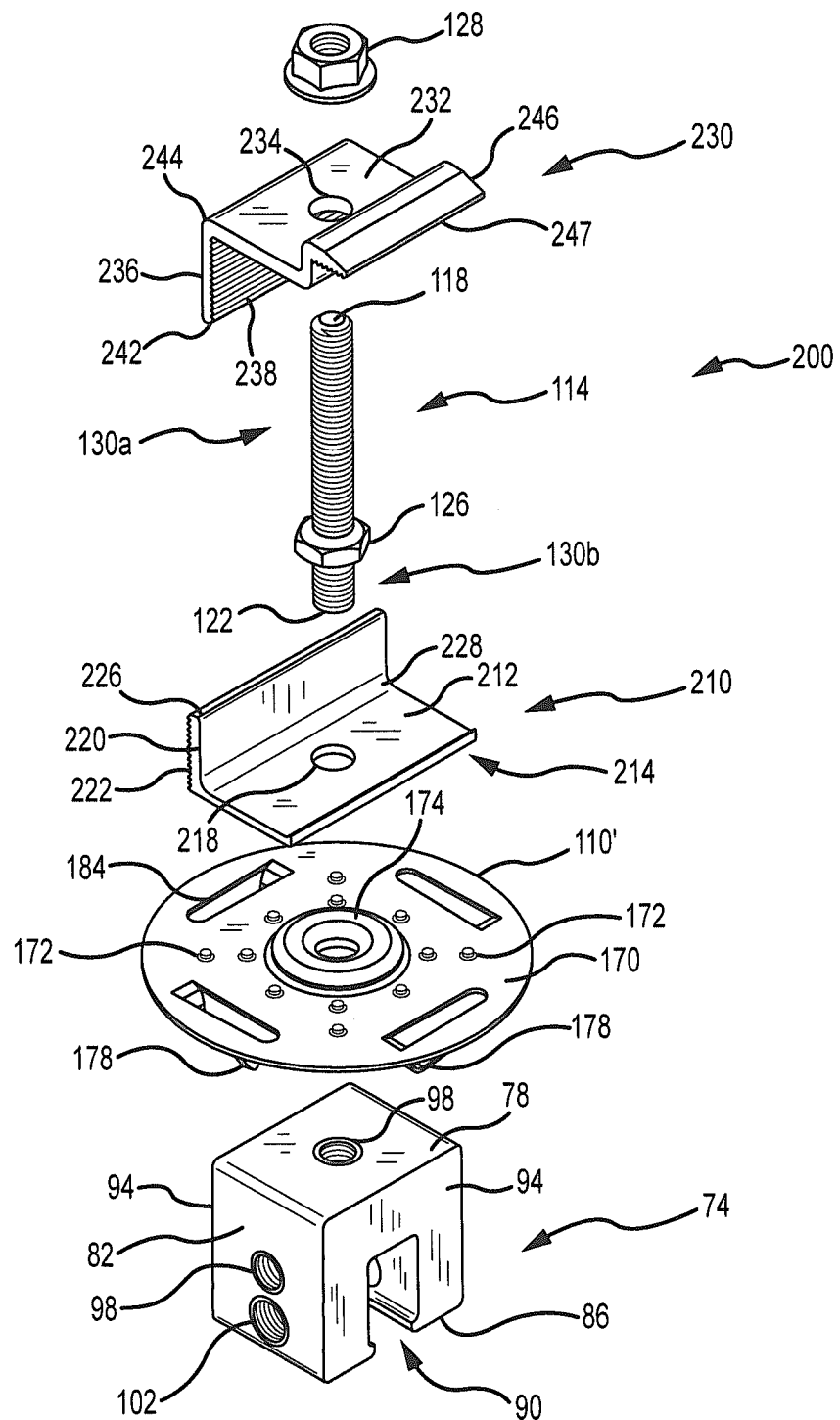
FIG. 11 is an embodiment of a photovoltaic module mounting assembly that uses an edge or end clamp.
Figure 12:
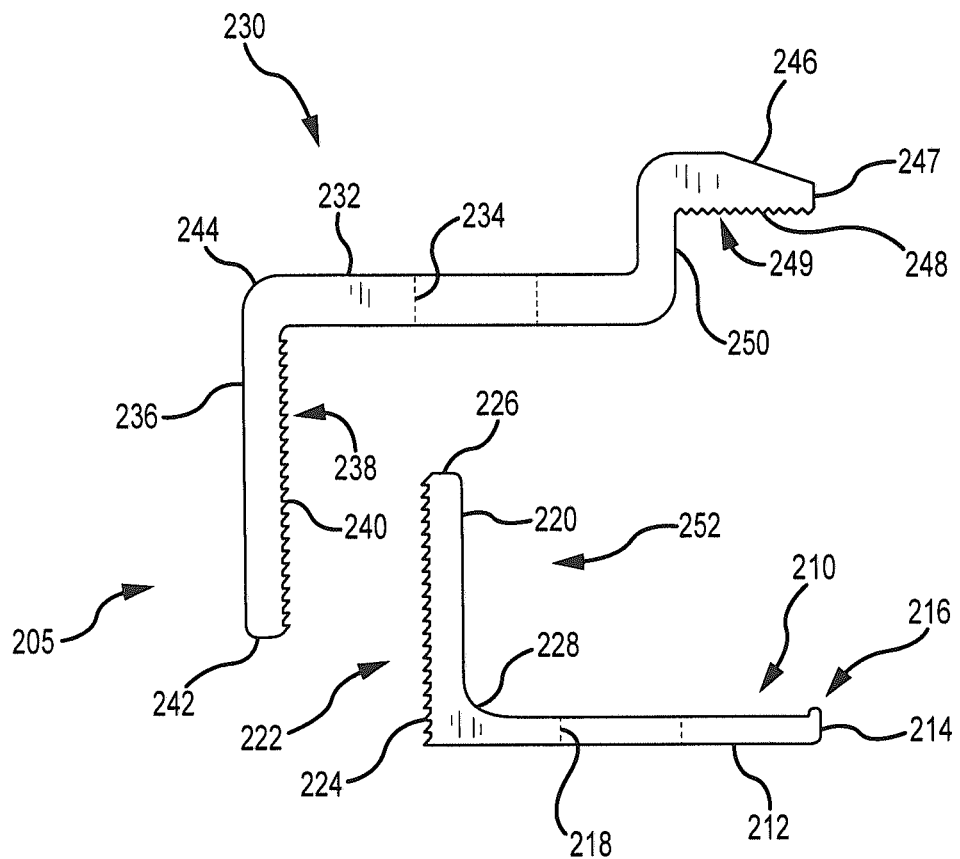
FIG. 12 is an end view of the upper and lower brackets for the edge clamp of the mounting assembly of FIG. 11.
Figure 13:
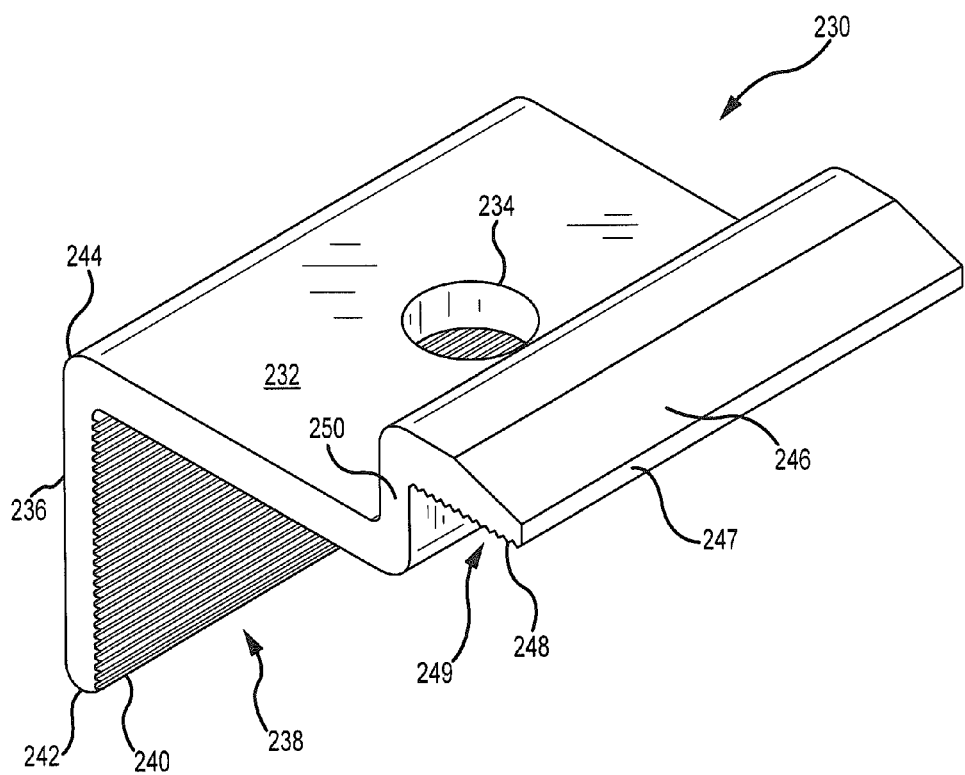
FIG. 13 is a perspective view of the upper bracket for the edge clamp of the mounting assembly of FIG. 11.
Figure 14:
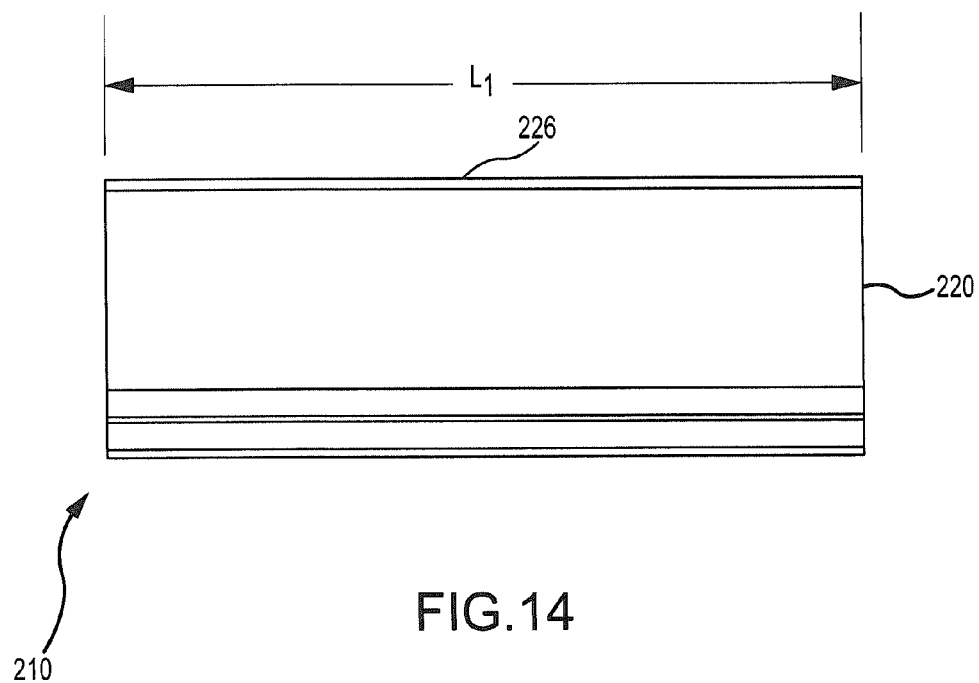
FIG. 14 is a side view of the lower bracket for the edge clamp of the mounting assembly of FIG. 11.
Figure 15:
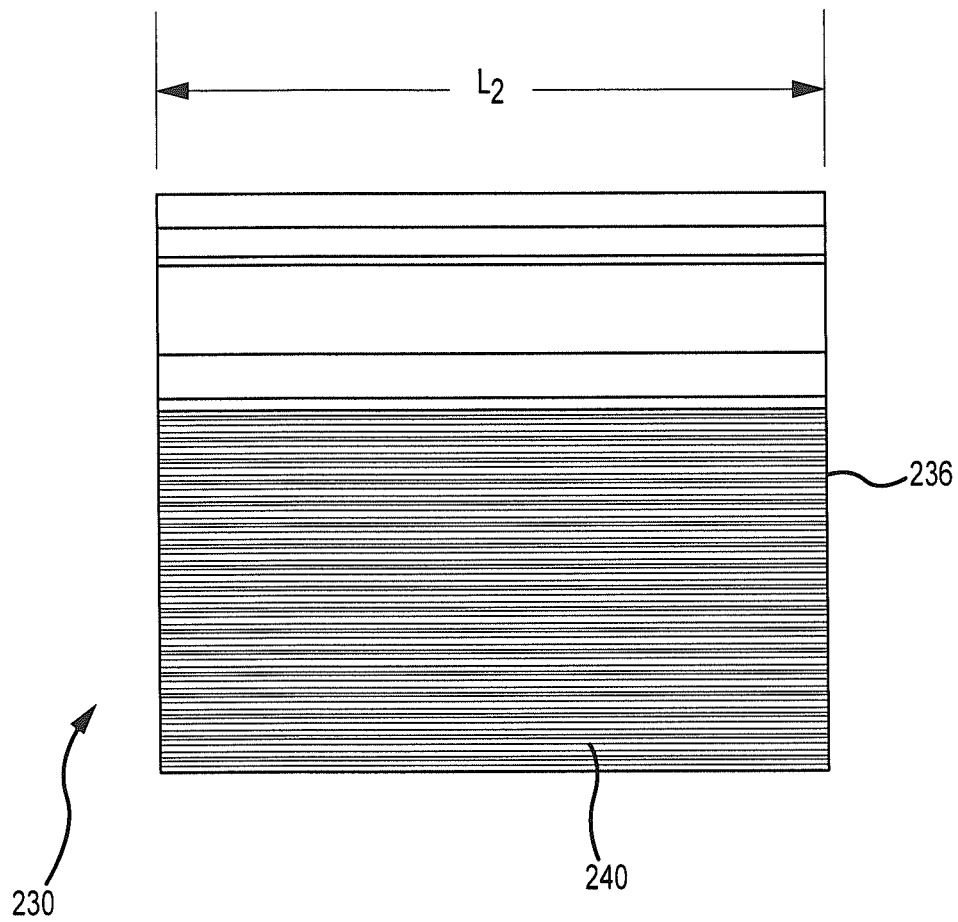
FIG. 15 is a side view of the upper bracket for the edge clamp of the mounting assembly of FIG. 11.

The mounting plate 110' from the mounting assembly 70c of FIGS. 8A-F uses a single raised structure 174 to provide a positional registration or alignment function for each of the two photovoltaic modules that may be clamped by a single mounting assembly 70c. Other types of positional registration or alignment features may be incorporated by a mounting plate. One representative embodiment is illustrated in FIGS. 10A-B in the form of a mounting plate 110". Generally, the mounting plate 110" may be used in place of the mounting plate 110' discussed above. Although not shown, it should be appreciated that the mounting plate 110" may also utilize the grounding projections 172 and/or wiring clips 178 (and their associated apertures 184).

The mounting plate 110" of FIGS. 10A and 10B differs from the mounting plate 110' of FIGS. 8A-F in a number of respects. One is the shape of the mounting plate 110'. Each of these mounting plates 110', 110" may be of any appropriate shape in relation to their respective outer perimeters (e.g., circular as in the case of the mounting plate 110; square as in the case of the mounting plate 110"; rectangular). Another is that the mounting plate 110" utilizes at least two discrete PV module positional registrants 190. Each of the PV module positional registrants 190 may be of any appropriate size, shape, and/or configuration. The PV module positional registrants 190 may be integrally formed with a remainder of the mounting plate 110" as shown where they have been stamped from the mounting plate 110" (creating corresponding apertures 192), or the PV module registrants 190 could be separately attached to the mounting plate 110". When the mounting plate 110" is positioned in the proper orientation on a mounting device 74, one of the PV module positional registrants 190 may be used to position one photovoltaic module on the mounting plate 110" (e.g., by this first photovoltaic module butting up against this first PV module positional registrant 190) such that it should be adequately engaged by the clamping member 142, and furthermore such that the other or second photovoltaic module to be positioned on the mounting plate 110" should also be adequately engaged by this same clamping member 142. In this regard, this second photovoltaic module may be positioned such that it butts up against the other or second of the PV module positional registrants 190 of the mounting plate 110".

As there are only two PV module positional registrants 190 in the illustrated embodiment of FIGS. 10A and 10B, the mounting plate 110" may need to be in a certain angular position or orientation on the mounting device 74 such that they provide a positional registration or alignment function for the two photovoltaic modules to be clamped by the associated mounting assembly. An installer could be required to place the mounting plate 110" onto the mounting device 74 in the correct angular position or orientation. Another option is for the mounting plate 110" to include one or more mounting device positional registrants 194 that facilitate the positioning of the mounting plate 110" onto the upper surface 78 of the mounting device 74 such that the PV module positional registrants 190 should be positioned to provide a positional registration or alignment function for the two photovoltaic modules to be clamped by the associated mounting assembly. In the illustrated embodiment, the mounting plate 110" includes a pair of mounting device positional registrants 194—a separate mounting device positional registrant 194 for each of the two opposite ends 94 of the mounting device 74 (e.g., one mounting device positional registrant 194 may engage one end 94 of the mounting device 74, and another mounting device positional registrant 194 may engage the opposite end 94 of the mounting device 74). A pair of mounting device positional registrants could be utilized by the mounting plate 110" and that engage the two opposite side surfaces 82 of the mounting device 74 to place the mounting plate 110" in the correct angular position relative to the mounting device 74. Yet another option would be to have at least one mounting device positional registrant for the mounting plate 110" that engages an end 94 of the mounting device 74 and at least one mounting device positional registrant for the mounting plate 110" that engages one of the side surfaces 82 of the mounting device 74. Any appropriate way of positionally registering the mounting plate 110" relative to the mounting device 74 may be utilized.

An embodiment of a photovoltaic module mounting assembly that utilizes an edge or end clamp is illustrated in FIGS. 11-15 and is identified by reference numeral 200. The mounting assembly 200 includes a mounting device 74, a mounting plate 110', a threaded stud 114 (e.g., a threaded clamp fastener), and an edge or end clamp 205. As discussed, the mounting device 74 may be positioned on a standing seam of a building surface. Other mounting devices may be appropriate for the mounting assembly 200.

The mounting plate 110' is positioned on an upper wall or surface 78 of the mounting device 74. The upper surface 170 of the mounting plate 110' includes the above-noted raised structure 174 and a plurality of grounding projections 172, while a plurality of the above-noted wiring clips 178 may be associated with the lower surface 176 or underside of the mounting plate 110'. The mounting plate 110' extends beyond a perimeter of the upper surface 170 of the mounting device 74. Other mounting plates may be used by the mounting assembly 200, including the mounting plates 110, 110" addressed above.

The edge clamp 205 includes a lower bracket 210 and an upper bracket 230 that collectively define a single, continuous pocket 252 for receiving an edge portion of a photovoltaic module. In the illustrated embodiment, the length $L_1$ (FIG. 14; e.g., about 2 inches) of the lower bracket 210 is greater than the length $L_2$ (FIG. 15; e.g., about 1.5 inches) of the upper bracket 230 (see FIG. 17B discussed below, where the lower bracket 210 extends beyond both ends of the upper bracket 230 in the length dimension). The length dimension of each of the lower bracket 210 and upper bracket 230 extends along an edge portion of a photovoltaic module when engaged by the mounting assembly 200.

The lower bracket 210 includes a first leg 212 and a second leg 220 that meet at a first intersection 228. In one embodiment, an included angle between the first leg 212 and the second leg 220 is about 90°. As such, the lower bracket 210 may be referred to as an L-bracket 210. However and more generally, the first leg 212 and second leg 220 may be characterized as being disposed in different orientations.

The first leg 212 extends away from the first intersection 228. When installed on a building surface, the first leg 212 may be characterized as extending within a horizontal or lateral dimension (e.g., a first dimension; within a plane that is at least generally parallel with the pitch of a roofing surface on which the mounting assembly 200 is installed). A free end 214 of the first leg 212 is spaced from the first intersection 228. A lip 216 extends in the direction of the overlying portion of the upper bracket 230 at the free end 214 of the first leg 212. A hole 218 is located between the first intersection 228 and the free end 214 of the first leg 212. In one embodiment, the hole 218 is un-threaded.

The second leg 220 of the lower bracket 210 extends away from the first intersection 228. When installed on a building surface, the second leg 220 may be characterized as extending within a vertical dimension (e.g., a second dimension; at least generally orthogonal to the pitch of a roofing surface on which the mounting assembly 200 is installed). A free end 226 of the second leg 220 is spaced from the first intersection 228. An outside surface 222 of the second leg 220 includes a plurality of spaced teeth 224. "Outside" in relation to surface 222 is in relation to the pocket 252—the surface 222 is on a side of the second leg 220 that faces or projects away from the single, continuous pocket 252 collectively defined by the lower bracket 210 and upper bracket 230.

The upper bracket 230 includes a third leg 232 and a fourth leg 236 that meet at a second intersection 244. In one embodiment, an included angle between the third leg 232 and the fourth leg 236 is about 90°. As such, the third leg 232 and the fourth leg 236 may be characterized as defining an L-shaped section for the upper bracket 230. However and more generally, the third leg 232 and fourth leg 236 may be characterized as being disposed in different orientations. The first leg 212 of the lower bracket 210 and the third leg 232 of the upper bracket 230 may be at least generally parallel to one another. The second leg 220 of the lower bracket 210 and the fourth leg 236 of the upper bracket 230 may be at least generally parallel to one another.

The third leg 232 of the upper bracket 230 extends away from the second intersection 244. When installed on a building surface, the third leg 232 may be characterized as extending within a horizontal or lateral dimension (e.g., a first dimension; within a plane that is at least generally parallel with the pitch of a roofing surface on which the mounting assembly 200 is installed).

A hole 234 extends through the third leg 232 of the upper bracket 230 at a location that is spaced from the second intersection 244. In one embodiment, the hole 234 is unthreaded. The hole 234 associated with the upper bracket 230 and the hole 218 associated with the lower bracket 210 may be mis-aligned in the vertical or second dimension—the centerline of the hole 234 (upper bracket 230) may be slightly offset from the centerline of the hole 218 (lower bracket 210) in the horizontal or lateral dimension (e.g., a first dimension). Stated another way, an axis extending between the centers of the holes 234, 218 may not be parallel with a reference axis that extends between and that is perpendicular to each of the first leg 212 of the lower bracket 210 and the third leg 232 of the upper bracket 230.

The fourth leg 236 of the upper bracket 230 extends away from the second intersection 244. When installed on a building surface, the fourth leg 236 may be characterized as extending within a vertical dimension (e.g., a second dimension; at least generally orthogonal to the pitch of a roofing surface on which the mounting assembly 200 is installed). A free end 242 of the fourth leg 236 is spaced from the second intersection 244. An inside surface 238 of the fourth leg 236 includes a plurality of spaced teeth 240. "Inside" in relation to surface 238 is in relation to the pocket 252—the surface 238 is on a side of the fourth leg 236 that faces or projects toward the single, continuous pocket 252 collectively defined by the lower bracket 210 and upper bracket 230.

The outside surface 222 of the second leg 220 (lower bracket 210) is disposed in interfacing relation with the inside surface 238 of the fourth leg 236 (upper bracket 230). Generally, teeth 224 associated with the second leg 220 (lower bracket 210) are disposed between teeth 240 associated with the fourth leg 236 (upper bracket 230) to interlock the lower bracket 210 with the upper bracket 230 in the vertical or second dimension (e.g., a given tooth 224 associated with the lower bracket 210 is disposed between a pair of adjacent teeth 240 of the upper bracket 230, and vice versa). This interlocking relation between the lower bracket 210 and the upper bracket 230 resists/impedes relative movement between the upper bracket 230 and the lower bracket 210 in the vertical dimension (e.g., a second dimension). The height or thickness of the pocket 252 may be adjusted by changing the amount of interface between the outside surface 222 of the second leg 220 (lower bracket 210) and the inside surface 238 of the fourth leg 236 (upper bracket 230). This allows the mounting assembly 200 to be used to clamp photovoltaic modules of different thicknesses or heights.

The upper bracket 230 also includes a head 246 that is spaced from the second intersection 244 (between the third leg 232 and the fourth leg 236). The head 246 is offset from the third leg 232 in the vertical dimension (e.g., a second dimension). In this regard, a transition section 250 extends from an end of the third leg 232 to the head 246. This disposes an underside 249 of the head 246 at a higher elevation than the third leg 232 when the mounting assembly 200 is positioned on a roofing surface. Stated another way, the underside 249 of the head 246 (upper bracket 230) is spaced further from a reference plane (that at least generally contains the first leg 212 of the lower bracket 210), compared to the third leg 232 (upper bracket 230). The underside 249 of the head 246 may include serrations 248 for interacting with a photovoltaic module being clamped by the mounting assembly 200.

Figure 16A:
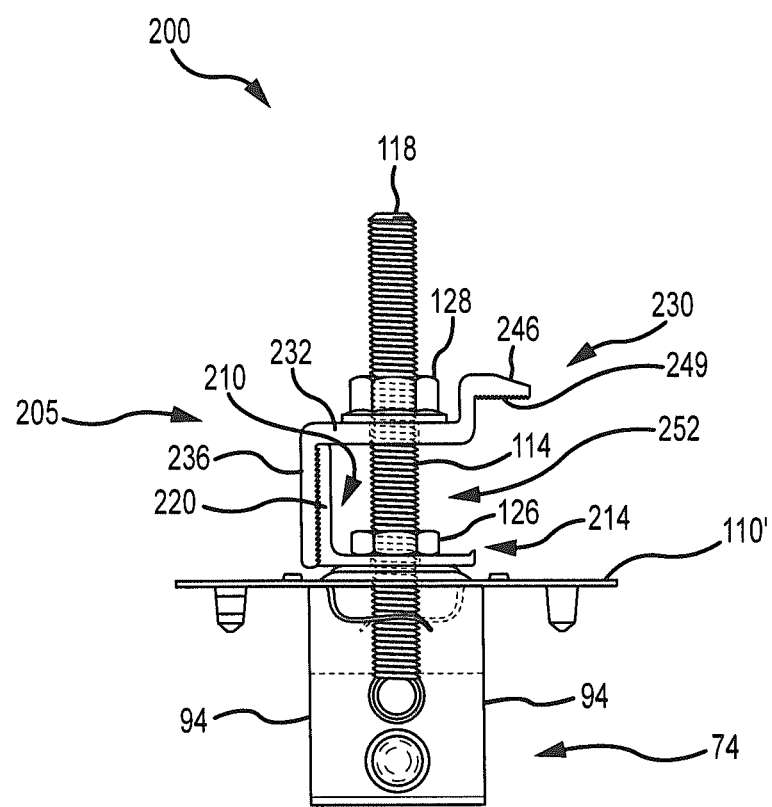
FIG. 16A is an end view of the mounting assembly of FIG. 11, adjusted to provide a clamping pocket of a first height.
Figure 16B:
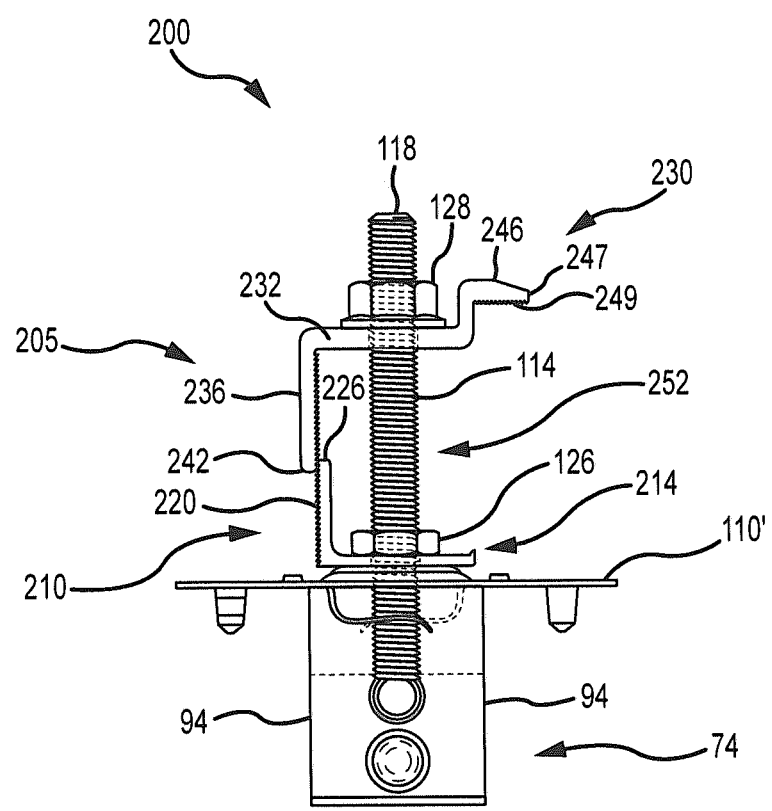
FIG. 16B is an end view of the mounting assembly of FIG. 11, adjusted to provide a clamping pocket of a second height.

FIGS. 16A and 16B show the mounting assembly 200 in an assembled condition or state. In each instance, the first stud end 118 of the stud 114 is directed through the hole 234 in the third leg 232 (upper bracket 230), while the second stud end 122 is directed through the hole 218 in the first leg 212 (lower bracket 210), then through the hole 112 in the mounting plate 110', and then into the threaded hole 98 on the upper surface or wall 78 of the mounting device 74. The stud 114 may be threaded into the mounting device 74 to dispose the nut 126 against the first leg 212 of the lower bracket 210. The nut 128 may be threaded onto first stud end 118 and may be disposed against the third leg 232 of the upper bracket 230.

FIG. 16A shows the mounting assembly 200 having been adjusted to provide a minimum clamping pocket—to provide a minimum thickness or height for the single, continuous pocket 252 collectively defined by the lower bracket 210 and the upper bracket 230. Here, the free end 226 of the second leg 220 (lower bracket 210) may be disposed against the underside of the third leg 232 of the upper bracket 230. This provides a maximum interface between the outside surface 222 of the second leg 220 (lower bracket 210) and the inside surface 238 of the fourth leg 236 (upper bracket 230). Relative motion between the upper bracket 230 and the lower bracket 210 in the vertical dimension (e.g., a second dimension) is restricted by the interlocking teeth 240, 224 as noted above.

FIG. 16B shows the mounting assembly 200 having been adjusted to provide a larger clamping pocket in the vertical dimension (e.g., a second dimension) than the FIG. 16A configuration—this may provide a maximum thickness or height for the single, continuous pocket 252 collectively defined by the lower bracket 210 and the upper bracket 230. Here, the free end 226 of the second leg 220 (lower bracket 210) is spaced from the underside of the third leg 232 of the upper bracket 230. This provides a reduced interface between the outside surface 222 of the second leg 220 (lower bracket 210) and the inside surface 238 of the fourth leg 236 (upper bracket 230), compared to the FIG. 16A configuration. However, relative motion between the upper bracket 230 and the lower bracket 210 in the vertical dimension (e.g., a second dimension) should still be restricted/impeded by the interlocking teeth 240, 224. It should be appreciated that the upper bracket 230 may be disposed at various intermediate locations between the positions of FIGS. 16A and 16B to accommodate the thickness or height of the photovoltaic module being engaged by the mounting assembly 200.

The only portion of the mounting assembly 200 that extends between the upper bracket 230 and the lower bracket 210 within the pocket 252 of the mounting assembly 200 is the stud 114. The second leg 220 of the lower bracket 210 may be characterized as being located between the stud 114 and the fourth leg 236 of the upper bracket 230 in the lateral or horizontal dimension (e.g., a first dimension). The free end 214 of the first leg 212 for the lower bracket 210 does not extend beyond a location in the lateral or horizontal dimension (e.g., a first dimension) that coincides with an outer perimeter of the mounting plate 110' in the illustrated embodiment. The free end 214 of the first leg 212 for the lower bracket 210 does extend beyond a location in the lateral or horizontal dimension (e.g., a first dimension) that coincides with an outer perimeter of the raised structure 174 in the illustrated embodiment. The free end 214 of the first leg 212 for the lower bracket 210 is offset from the head 246 of the upper bracket 230 in the lateral or horizontal dimension (e.g., a first dimension). In the illustrated embodiment, an end 247 of the head 246 is spaced further from the stud 114 than the free end 214 of the first leg 212 for the lower bracket 210, measured in the lateral or horizontal dimension (e.g., a first dimension). However, the head 246 does not protrude beyond a location in the lateral or horizontal dimension (e.g., a first dimension) that coincides with the outer perimeter of the mounting plate 110'.

Having the second leg 220 of the lower bracket 210 be positioned inside the fourth leg 236 of the upper bracket 230 provides a desired rotational resistance for the mounting assembly 200. When the nut 128 is activated to clamp a photovoltaic module between the upper bracket 230 and the lower bracket 210, the upper bracket 230 will try to rotate counterclockwise in the views shown in FIGS. 16A and 16B (reducing the offset in the lateral dimension between the fourth leg 236 and the hole 234 should reduce the amount of the force that attempts to rotate the upper bracket 230 in the manner). Having the second leg 220 of the lower bracket 210 be positioned inside the fourth leg 236 of the upper bracket 230 resists this rotational motion and may stabilize the mounting assembly 200.

The mounting assembly 200 may incorporate a feature to facilitate a forcible engagement between the fourth leg 236 of the upper bracket 230 and the second leg 220 of the lower bracket 210. The above-noted offset of the hole 234 (upper bracket 230) and the hole 218 (lower bracket 210) in the horizontal or lateral dimension (e.g., the stud 114 may not be disposed orthogonal to the pitch of a roofing surface on which the mounting assembly 200 is installed because of this offset) should force the fourth leg 236 of the upper bracket 230 into engagement with the second leg 220 of the lower bracket 210 as the nut 128 is tightened to increase the clamping force being exerted by the lower bracket 210 and upper bracket 230 on a photovoltaic module.

Figure 17A:
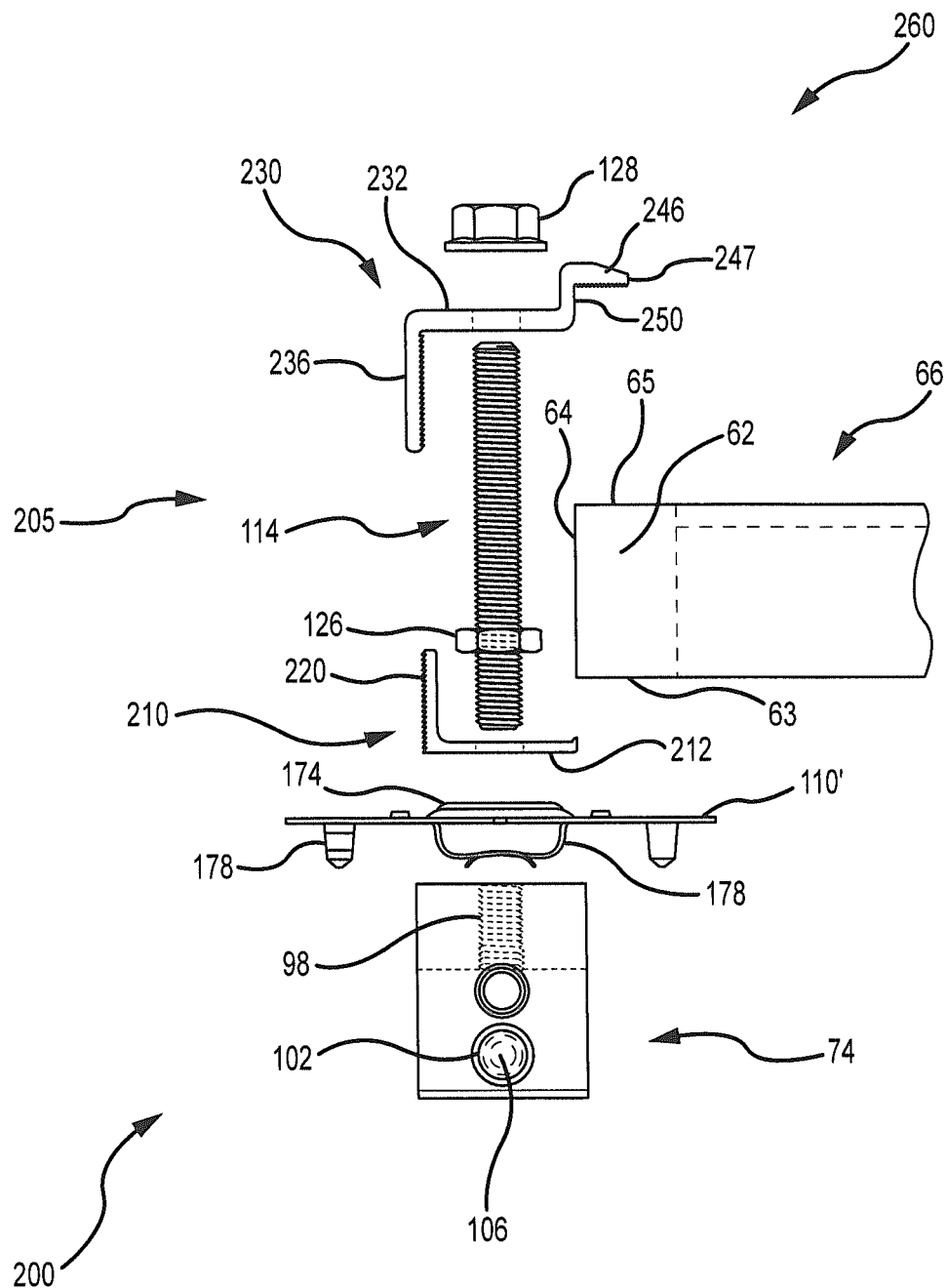
FIG. 17A is an embodiment of a photovoltaic system that uses the mounting assembly of FIG. 11.
Figure 17B:
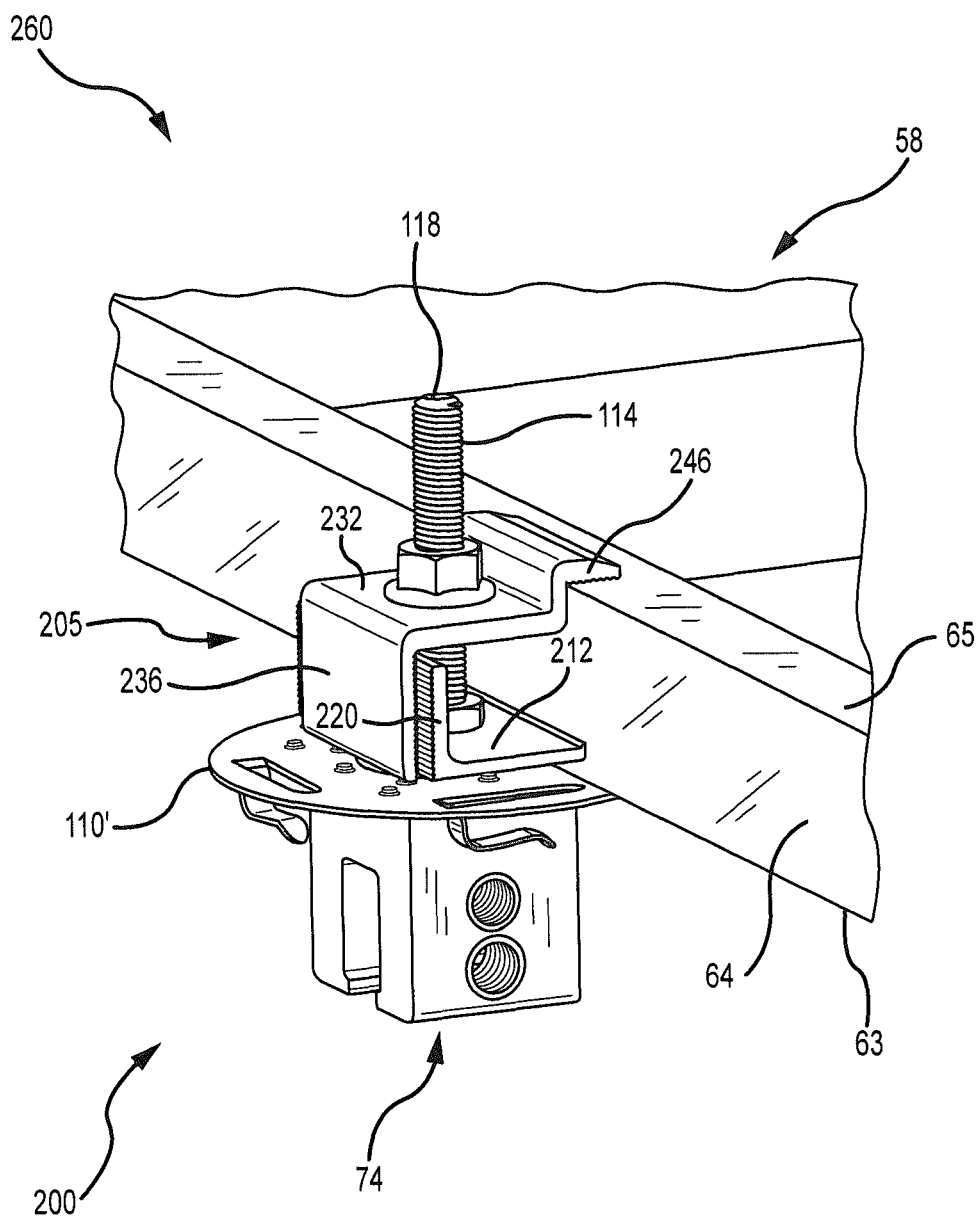
FIG. 17B is a perspective view of the photovoltaic system of FIG. 17A.

FIGS. 17A and 17B illustrate a photovoltaic system 260, where a photovoltaic module 58 is engaged by the above-described mounting assembly 200, for instance the frame 62 of the module 58. Generally, a lower or bottom surface 63 of a photovoltaic module 58 is positioned on the upper surface 170 of the mounting plate 110.' The free end 214 of the first leg 212 (of the lower bracket 210) may be positioned against a side surface 64 of this module 58. The underside 249 of the head 246 for the upper bracket 230 is positioned against an upper surface 65 of the photovoltaic module 58. The stud 114 is threaded into the mounting device 74 to clamp the lower bracket 210 to the mounting device 74. The nut 128 is threaded onto the stud 114 to clamp an edge section of the photovoltaic module 58 between the upper bracket 230 and the lower bracket 210.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A photovoltaic module mounting assembly, comprising:
  a mounting device attachable to a building surface;
  a mounting plate positioned on said mounting device;
  a lower bracket comprising first and second legs, wherein said first leg is positioned on said mounting plate, wherein a free end of said first leg fails to extend beyond a location in a first dimension that coincides with an outer perimeter of said mounting plate, and wherein said second leg extends away from said first leg in a second dimension; and
  an upper bracket comprising third and fourth legs, wherein said third leg of said upper bracket and said first leg of said lower bracket are spaced from one another in said second dimension, wherein said fourth leg of said upper bracket extends away from said third leg of said upper bracket and engages said second leg of said lower bracket; and
  a threaded clamp fastener that extends through said third leg of said upper bracket, through an open space between said third leg of said upper bracket and said first leg of said lower bracket, through said first leg of said lower bracket, through said mounting plate, and into threaded engagement with said mounting device, wherein said second leg of said lower bracket is located between said threaded clamp fastener and said fourth leg of said upper bracket in said first dimension, wherein a first mating surface of said second leg of said lower bracket comprises a plurality of spaced teeth and projects toward said fourth leg of said upper bracket, wherein a second mating surface of said fourth leg of said upper bracket comprises a plurality of spaced teeth and projects toward said second leg of said lower bracket, and wherein said first and second mating surfaces are disposed in interlocking relation to restrict relative motion between said upper bracket and said lower bracket in said second dimension.

2. The mounting assembly of claim 1, wherein said mounting device comprises a slot configured to receive a standing seam of a building surface.

3. The mounting assembly of claim 1, wherein said mounting plate extends beyond a perimeter of said mounting device in said first dimension.

4. The mounting assembly of claim 1, wherein an included angle between said first and second legs of said lower bracket is about 90°.

5. The mounting assembly of claim 1, wherein said first leg of said lower bracket and said third leg of said upper bracket are at least substantially parallel to one another.

6. The mounting assembly of claim 1, wherein lower bracket said lower bracket and said upper bracket collectively define a single, continuous pocket for receiving an edge portion of a photovoltaic module.

7. The mounting assembly of claim 6, wherein a height of said pocket is adjustable by changing a position of said upper bracket relative to said lower bracket which changes a spacing between said first leg and said third leg in said second dimension, wherein changing said height of said pocket changes an amount of an interlocking interface between said first and second mating surfaces that restricts relative motion between said upper bracket and said lower bracket in said second dimension.

8. The mounting assembly of claim 1, wherein a length dimension of each of said lower bracket and said upper bracket extends along an edge portion of a photovoltaic module when engaged by said mounting assembly, and wherein said lower bracket has a larger said length dimension than said upper bracket.

9. The mounting assembly of claim 1, wherein said free end of said first leg of said lower bracket comprises a raised lip that extends in a direction of an overlying portion of said upper bracket.

10. The mounting assembly of claim 1, wherein said free end of said first leg of said lower bracket engages a side surface of a photovoltaic module when a bottom surface of the photovoltaic module is positioned on said mounting plate.

11. The mounting assembly of claim 1, wherein said lower bracket and said upper bracket collectively define a single, continuous pocket for receiving an edge portion of a photovoltaic module, wherein said threaded clamp fastener extends through said pocket and is the only structure of said mounting assembly that is located within said pocket.

12. The mounting assembly of claim 1, wherein an included angle between said third and fourth legs of said upper bracket is about 90°.

13. The mounting assembly of claim 1, wherein said upper bracket further comprises a head that offset from said third leg of said upper bracket in said second dimension.

14. The mounting assembly of claim 13, wherein said head is disposed at a higher elevation than said third leg of said upper bracket.

15. The mounting assembly of claim 13, wherein a free end of said head and said free end of said first leg of said lower bracket are offset in said first dimension.

16. The mounting assembly of claim 13, wherein a free end of said head is positioned further from said threaded clamp fastener in said first dimension than said free end of said first leg of said lower bracket.

17. The mounting assembly of claim 13, wherein a transition section extends between said third leg of said upper bracket and said head, wherein said transition section of said upper bracket and said free end of said first leg of said lower bracket are at least generally aligned in said second dimension.

18. A photovoltaic system, comprising:
a photovoltaic module, wherein said photovoltaic module comprises a first side surface, an upper surface, and a lower surface; and
the mounting assembly of claim 13, wherein said lower surface of said photovoltaic module is positioned on said mounting plate.

19. The photovoltaic system of claim 18, wherein said free end of said first leg of said lower bracket engages said first side surface of said photovoltaic module.

20. The photovoltaic system of claim 18, wherein said head engages said upper surface of said photovoltaic module.

21. The mounting assembly of claim 1, wherein a single continuous open space extends from said second leg of said lower bracket in said second dimension in a direction that is away from said fourth leg of said upper bracket.

22. The mounting assembly of claim 1, further comprising:
a first nut mounted on said threaded clamp fastener and engaged with said third leg of said upper bracket, wherein said first nut is positioned outside of a space between said lower bracket and said upper bracket; and
a second nut mounted on said threaded clamp fastener and engaged with said first leg of said lower bracket, wherein said second nut is positioned within said space between said lower bracket and said upper bracket.

23. A photovoltaic system, comprising:
a photovoltaic module; and
the mounting assembly of claim 1.

24. A photovoltaic module mounting assembly, comprising:
a mounting device attachable to a building surface;
a lower bracket comprising first and second legs, wherein said first leg extends in a first dimension from a first intersection between said first and second legs, wherein said second leg extends in a second dimension from said first intersection, and wherein said first and second dimensions are at least generally orthogonal to one another,
an upper bracket comprising third and fourth legs, wherein said third leg extends in said first dimension from a second intersection between said third and fourth legs, wherein said fourth leg extends in said second dimension from said second intersection, and wherein said second leg of said lower bracket engages said fourth leg of said upper bracket; and
a threaded clamp fastener that extends through said third leg of said upper bracket, through an open space between said third leg of said upper bracket and said first leg of said lower bracket, through said first leg of said lower bracket, and into threaded engagement with said mounting device, wherein said second leg of said lower bracket is located between said threaded clamp fastener and said fourth leg of said upper bracket in said first dimension, wherein a first mating surface of said second leg of said lower bracket comprises a plurality of spaced teeth and projects toward said fourth leg of said upper bracket, wherein a second mating surface of said fourth leg of said upper bracket comprises a plurality of spaced teeth and projects toward said second leg of said lower bracket, and wherein said first and second mating surfaces are disposed in interlocking relation to restrict relative motion between said upper bracket and said lower bracket in said second dimension.

\* \* \* \* \*

UNITED STATES PATENT AND TRADEMARK OFFICE
CERTIFICATE OF CORRECTION

PATENT NO. : 8,925,263 B2
APPLICATION NO. : 13/965441
DATED : January 6, 2015
INVENTOR(S) : Dustin M. M. Haddock and Robert M. M. Haddock Page 1 of 1

It is certified that error appears in the above-identified patent and that said Letters Patent is hereby corrected as shown below:

In the Claims

At Column 22, Claim 6, lines 58-59, delete "lower bracket".

Signed and Sealed this
Twenty-third Day of June, 2015

Michelle K. Lee
*Director of the United States Patent and Trademark Office*